(12) United States Patent
Satou et al.

(10) Patent No.: US 8,335,388 B2
(45) Date of Patent: Dec. 18, 2012

(54) IMAGE CODING APPARATUS AND IMAGE CODING METHOD

(75) Inventors: Shinichi Satou, Kanagawa (JP); Shinya Kadono, Hyogo (JP)

(73) Assignee: Panasonic Corporation, Osaka (JP)

( * ) Notice: Subject to any disclaimer, the term of this patent is extended or adjusted under 35 U.S.C. 154(b) by 657 days.

(21) Appl. No.: 12/568,894

(22) Filed: Sep. 29, 2009

(65) Prior Publication Data

US 2010/0080478 A1 Apr. 1, 2010

(30) Foreign Application Priority Data

Sep. 29, 2008 (JP) ................................. 2008-251395
Sep. 29, 2008 (JP) ................................. 2008-251396
Sep. 18, 2009 (JP) ................................. 2009-218100

(51) Int. Cl.
*G06K 9/36* (2006.01)
*G06K 9/46* (2006.01)

(52) U.S. Cl. ............... 382/238; 375/240.13; 375/240.24

(58) Field of Classification Search .................. 382/236, 382/237, 238, 248, 250; 375/240.12, 240.13, 375/240.2, 240.24
See application file for complete search history.

(56) References Cited

U.S. PATENT DOCUMENTS 5,825,931 A   10/1998   Owada et al.
7,146,056 B2* 12/2006   Klein Gunnewiek et al. ............................ 382/236

FOREIGN PATENT DOCUMENTS

JP          6-038194          2/1994

OTHER PUBLICATIONS

ISO/IEC13818-2, "Information technology—Generic coding of moving pictures and associated audio information: Video", International Standard, Second Edition, Dec. 15, 2000, pp. i-x, 1-208.

* cited by examiner

*Primary Examiner* — Phuoc Tran

(74) *Attorney, Agent, or Firm* — Wenderoth, Lind & Ponack, L.L.P.

(57) ABSTRACT

An image coding apparatus is mainly characterized by (i) dividing each of fields into an I-slice and P-slices, and determining the position of the I-slice in each of a predetermined number of first fields such that a current I-slice is sequentially shifted from the first end of a starting first field to the second end of an ending first field and such that a similar shift is repeated for each predetermined number of first fields, when a current field is a first field, and further (ii) determining, when the current field is the first field, that each P-slice located closer to the first end than a corresponding I-slice can refer to only a first field coded immediately before, and determining, when the current field is the second field, that at least one second field in the predetermined number of fields can refer to only a first field coded immediately before.

14 Claims, 23 Drawing Sheets

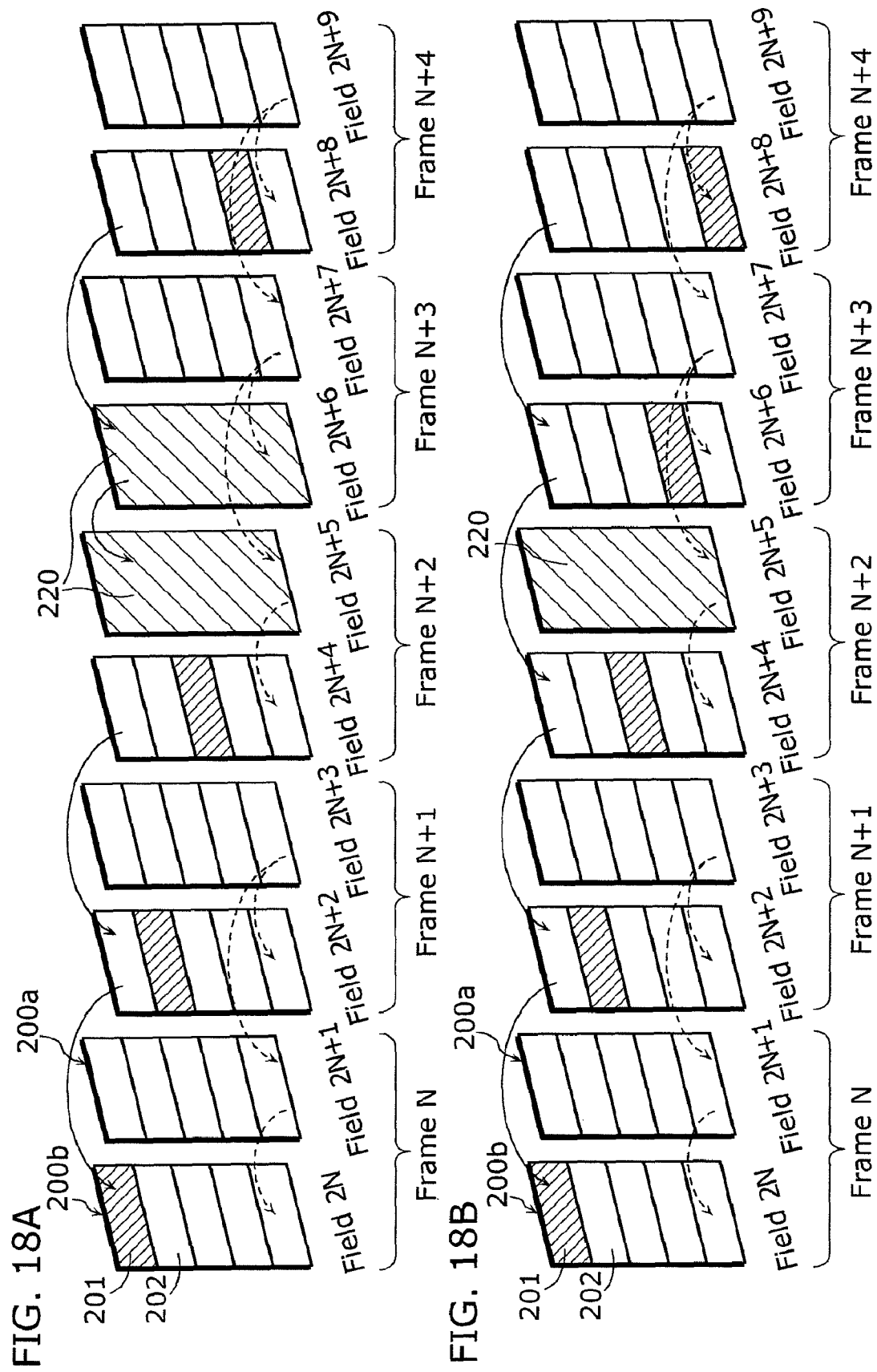

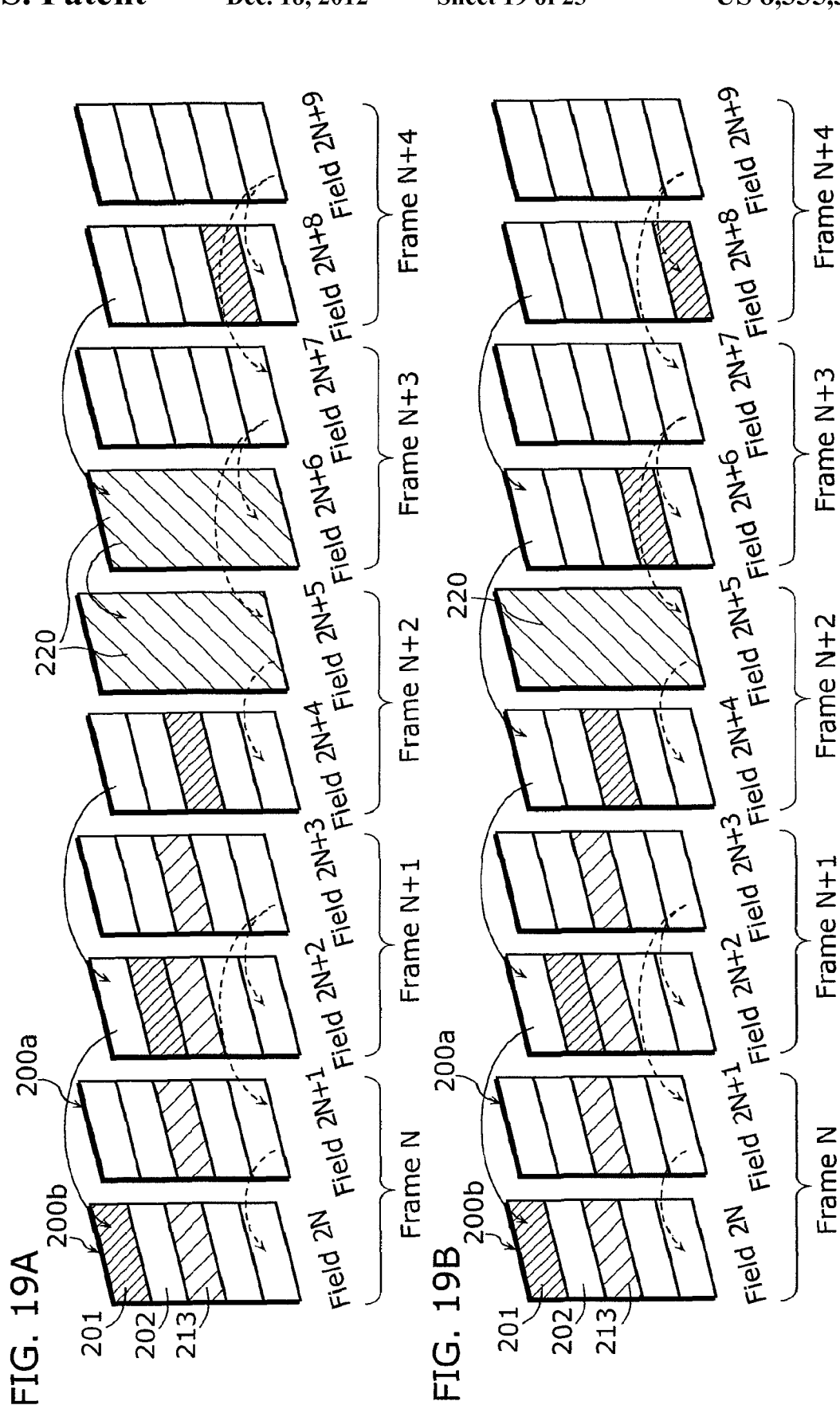

IMAGE CODING APPARATUS AND IMAGE CODING METHOD

BACKGROUND OF THE INVENTION (1) Field of the Invention

The present invention relates to an image coding apparatus and an image coding method for coding interlace video signals, a recording medium storing a program causing a computer to execute the image coding method, and an integrated circuit corresponding to the image coding apparatus.

(2) Description of the Related Art

Recently, the multi-media era has come in which sound, pictures and other pixel values are integrated into one media, and conventional information media as communication tools like newspapers, magazines, TV, radio and telephone are regarded as the targets of multi-media. Generally, multi-media is a form of simultaneous representation of not only characters but also graphics, sound, and especially pictures. In order to handle the above-described conventional information media as multi-media, it is a requisite to represent the information digitally.

However, it is unrealistic to directly process a huge amount of information digitally using the above-described conventional information media because, when calculating the data amount of each information medium described above as digital data amount, data amount per character is 1 to 2 bytes while that of sound per second is not less than 64 K bits (telephone speech quality) and that of moving pictures per second is not less than 100 M bits (present TV receiving quality). For example, a TV telephone has already become commercially practical thanks to Integrated Services Digital Network (ISDN) with a transmission speed of 64 kbps to 1.5 Mbps, but it is impossible to transmit moving pictures of TV camera as they are using ISDN.

That is why information compression technique is necessary. For example, a moving picture compression technique standard of H. 261 or H. 263 which is recommended by the International Telecommunication Union-Telecommunication Standardization Sector (ITU-T) is used for TV telephones. In addition, with the information compression technique of the MPEG-1 standard, it becomes possible to store image information, together with sound information, in a normal CD (Compact disc) for music.

Here, Moving Picture Experts Group (MPEG) is an international standard to digitally compress moving picture signals, and has been standardized by the ISO/IEC (the International Standardization Organization/International Engineering Consortium). MPEG-1 is the standard to compress moving picture signals down to 1.5 Mbps, that is, to compress TV signal information to about one hundredth. Also, the quality which satisfies the MPEG-1 standard is medium level which can be realized at a transmission rate of about 1.5 Mbps. MPEG-2 is thus standardized in order to satisfy the need for higher picture quality (See Non-patent Reference). MPEG-2 compresses moving picture signals to 2 to 15 Mbps to achieve TV broadcasting quality.

At present, the work group (ISO/IEC JTC1/SC29/WG11), which standardized MPEG-1 and MPEG-2, has standardized MPEG-4 with new functions necessary in this multi-media era. The MPEG-4 standard achieves a compression rate higher than those of MPEG-1 standard and MPEG-2 standard, and enables coding, decoding and performing operations on an object-by-object basis.

The initial object of MPEG-4 standard is to standardize a coding method of pictures with low bit rates, but the object is extended to a general purpose coding method for video including interlace pictures with high bit rates. At present, ISO/IEC and ITU-T, in combination, has standardized MPEG-4 AVC (Advanced Video Coding) as a picture coding method for pictures with a higher compression rate.

Here, an image signal can be considered as a sequence of pictures (that are also referred to as frames or fields) each of which is a set of pixels having the same time. A current pixel has a high correlation with neighbouring pixels within a current picture, and thus the correlation between the pixels in the picture is used in the compression of an image signal. Consecutive pictures have high pixel correlation with each other, and thus the pixel correlation between the pictures is used in the compression of an image signal. Here, compression using (i) correlation between pixels in a picture and pixels in another picture, and (ii) correlation between pixels within a picture is referred to as inter coding or inter picture coding. On the other hand, compression using correlation between pixels within a picture without using correlation between pixels in a picture and pixels in another picture is referred to as intra coding or intra picture coding. With the use of correlation between pictures, inter coding makes it possible to achieve a compression rate higher than a compression rate obtainable in intra coding.

In MPEG-1, MPEG-2, MPEG-4, MPEG-4 AVC, and H. 264, intra coding and inter coding are switched in units of a block (or a macroblock) which is a set of two-dimensionally arranged pixels each having a rectangular area.

This is described in more detail. In the case of an intra coding, the image coding apparatus generates a predictive error block using correlation between pixel blocks within a picture or correlation between pixels within the picture. In the case of an inter coding, the image coding apparatus generates a predictive error block using correlation between pictures. Next, the image coding apparatus performs two-dimensional orthogonal transform such as DCT (Discrete Cosine Transform) on these blocks. Next, the image coding apparatus quantizes the frequency components of the blocks that have been subjected to the orthogonal transform, performs variable length coding on the quantized values obtained as the result of the quantization, and transmits the results of variable length coding to a network.

Here, when a quantization step size which is a quantization width used in quantization is large, a high compression rate can be obtained with a large degree of image coding distortion. In contrast, the use of a small quantization step size enables reduction in the degree of image coding distortion, resulting in a low compression rate. In general, the image coding apparatus derives quantization step sizes such that bit rates fall within a certain range and that the quantization step sizes within each picture become approximately constant. This is because uneven quantization step sizes within a picture causes uneven coding distortion, resulting in noticeable coding distortion.

On the other hand, high-speed network environments using ADSL or optical fibers have been widespread. With these environments, data can be communicated at a bit rate of several Mbps at home. Further, it is likely that data can be communicated at a bit rate of several tens of Mbps in the future several years. It is predicted that the use of the aforementioned image coding technique facilitates introduction of TV telephones and TV conference systems of TV broadcasting quality or HDTV broadcasting quality to not only corporations using exclusive lines but also general households.

When coded image data that is a stream is transmitted via a network, the stream may be partly lost due to network congestion or the like. In the case where the stream is partly lost, a receiving side cannot correctly decode the image corresponding to the lost part. In other words, the image quality deteriorates. To prevent this, a coding unit which is a set of blocks is defined as a slice. A slice is the minimum unit of independent coding and decoding. In other words, even when a part of a stream is lost, decoding can be performed on a slice basis.

FIG. 21 is a diagram showing the relationship between slices and blocks in the case of using a slicing method according to the MPEG-2 standard. A picture 500 (a frame or an I-field) shown in FIG. 21 is made up of plural blocks 502 (macroblocks). The blocks 502 in a line among the blocks 502 constituting the picture 500 make up of a slice 501.

FIG. 22 is a diagram showing the coding order of the blocks 502 included in the picture 500. The blocks 502 included in the picture 500 are coded according to the order shown in FIG. 22, that is, in the order from left to right within each slice and from the upper-most slice to the lower-most slice within the picture 500.

Here, in the case where the stream is partly lost as mentioned above, the receiving side cannot correctly decode the image corresponding to the lost part. Further, in the case where inter coding is used, the status where correct decoding is impossible affects (continues to) the following pictures to be decoded. Hereinafter, this is also referred to as error propagation.

An example of a known method for preventing such error propagation is the technique disclosed in the Patent Reference indicated below.

FIG. 23 is a diagram showing an exemplary structure of a stream used in the technique disclosed in the Patent Reference. As shown in FIG. 23, in coding processing performed by the image coding apparatus disclosed in the Patent Reference, an I-slice 201 (refresh slice) which is coded using only intra coding is included in each of pictures, and the position of a current I-slice 201 is sequentially moved on a picture-by-picture basis, and such movement is repeated for each refresh cycle. With this, the image coding apparatus disclosed in the Patent Reference can forcedly refresh the slices located at all the positions in a picture at least once during a refresh cycle, and therefore can prevent error propagation.

Patent Reference

Japanese Unexamined Patent Application Publication No. 6-38194

Non-Patent Reference

MPEG-2 Standards: ISO/IEC13818-2, "Information Technology—Generic CODING Of MOVING Pictures and Associated AUDIO Information: Video", International Standard, Second Edition, December 2000

SUMMARY OF THE INVENTION

However, the aforementioned conventional art entails the problems described below.

The conventional art allows forcible refresh on a progressive video signal without significantly decreasing a compression rate. However, the problem is that forcible refresh on an interlace video signal according to the conventional art results in significant decrease in compression rate.

The conventional art has been made assuming that progressive video signals are the targets, and reference control is performed such that only a single reference picture can be used as the reference picture for each unit of coding. In the case of a progressive video signal, a current frame has the highest correlation with the immediately-preceding frame. Thus, when the current frame refers to only the immediately-preceding frame, the decrease in the resulting compression rate is small.

On the other hand, in the case of an interlace video signal, an image signal corresponding to a frame is made up of two fields that are a top field and a bottom field. In the frame, the firstly-appearing field is referred to as a first field, and the next (secondly-appearing) field is referred to as a second field. Further, when comparing the two types of fields, top fields have the same parity, bottom fields have the same parity, and a top field and a bottom field has a mutually different parity.

In the case of an interlace video signal, a current field constituting a frame is temporally closest to the immediately-preceding field having a parity different from the parity of the current field. In the same case, the current field is spatially closest to the immediately-preceding field among the fields having the same parity (the field having the same pixel position with the field in the current frame), that is, the field preceding the current field by two fields. Thus, it is preferable that a pixel with a large motion is coded with reference to the immediately-preceding field that is temporally closest among the fields having the different parity. In addition, it is preferable that a pixel with a small motion is coded with reference to the immediately-preceding field that is spatially closest among the preceding fields having the same parity. In other words, when an interlace video signal is coded with reference to only the immediately-preceding field, the resulting compression rate decreases significantly.

The present invention has been made considering the above-described problems. The present invention has an object to provide an image coding apparatus and image coding method for preventing en error occurred in an interlace video signal from propagating to the following fields, and suppressing deterioration in compression rate.

In order to achieve the aforementioned object, an image coding apparatus that divides each of image data which is included in a corresponding one of fields into blocks each having a predetermined size, and performs predictive coding on each of the divided blocks includes: a parity judgment unit configured to judge whether a current field to be coded among the fields is a first field or a second field; a slice control unit configured to (i) divide the current field into an I-slice including intra coding blocks among the blocks and P-slices each including inter coding blocks among the blocks, (ii) determine the position of a current I-slice in a current first field included in a predetermined number of first fields such that the current I-slice is sequentially shifted, on a per first field basis, from the first end of a starting first field to the second end of an ending first field in the predetermined number of first fields and such that a shift similar to the shift from the starting first field to the ending first field is repeated for each predetermined number of first fields, the slice control unit making the division (i) and the determination (ii) in the case where the current field is the first field; a reference image control unit configured to determine, in the case where the current field to be coded is the first field, that each P-slice located closer to the first end than a corresponding one of the I-slices among the P-slices included in the current first field can refer to only a first field coded immediately before the current first field including the P-slice among first fields coded before the current first field, and to determine, in the case where the current field to be coded is the second field, that at least one second field included in the predetermined number of fields can refer to only a first field coded immediately before at least one second field, the first fields referred to in both the cases being reference fields; and a coding unit configured to code all the blocks included in each I-slice with reference to pixels within the I-slice, and code all the blocks included in each P-slice with reference to either pixels within the field including the P-slice or pixels in the determined reference field.

With this structure, in coding processing performed by the image coding apparatus according to the present invention, the position of a current I-slice is sequentially moved to each of the first fields, more specifically, the position of the current I-slice is shifted starting from a first end of the starting first field to a second end of the ending first field included in a cycle (in a predetermined number of fields). In addition, the current first P-slice in each first field refers to only the first field coded immediately before the first field including the current first P-slice among the first fields coded before the first field including the current first P-slice. With this, the data in all the slice positions of each first field is refreshed in each cycle. Thus, the image coding apparatus according to the present invention can prevent error propagation due to data loss at least in each cycle even when the data loss occurs during the transmission of a coded first field.

Further, in coding processing performed by the image coding apparatus according to the present invention, at least one of the second fields included in each cycle can refer to only the first field coded immediately before at least one second field. As described above, all the slices in the first fields are refreshed on a cycle basis. For this, even in the case where data loss occurs in the second field, the image coding apparatus according to the present invention can stop error propagation due to the data loss in at least one second field that refers to only the first field coded immediately before at least one second field. Thus, even in the case where several fields are referred to, the image coding apparatus according to the present invention can stop error propagation due to the data loss in at least one second field that refers to only the first field coded immediately before at least one second field. In this way, the image coding apparatus according to the present invention can suppress deterioration in compression rate of an interlace video signal compared to the case of performing reference control such that all of the first fields and the second fields can refer to only a single field.

In this way, the image coding apparatus according to the present invention can prevent an error occurred in an interlace video signal on a transmission path from propagating to the following fields, and suppress deterioration in compression rate.

In addition, it is preferable that the slice control unit of the image coding apparatus is configured to divide the field into only P-slices in the case where the current field to be coded is the second field With this structure, in coding processing performed by the image coding apparatus according to the present invention, each second field does not include any I-slice. Here, an I-slice requires coding bits larger than the coding bits required for a P-slice. Thus, the image coding apparatus according to the present invention can reduce coding bits compared to the case where every field includes an I-slice.

In addition, it is preferable that the reference image control unit of the image coding apparatus is configured to determine, in the case where the current field to be coded is the second field, that at least one second field included in the predetermined number of fields can refer to only a first field coded immediately before at least one second field, and each of the other second fields in the predetermined number of fields can refer to a plurality of reference fields determined for the field.

With this structure, in coding processing performed by the image coding apparatus according to the present invention, each of the second fields included in each cycle includes a second field that refers to two or more fields. In this way, the image coding apparatus according to the present invention can achieve an interlace video signal with a high compression rate.

In addition, it is preferable that the reference image control unit of the image coding apparatus is configured to determine, in the case where the current field to be coded is the first field, that each P-slice located closer to the second end than a corresponding one of the I-slices among the P-slices included in the current field can refer to a plurality of reference fields.

With this structure, in coding processing performed by the image coding apparatus according to the present invention, each of the second P-slices included in the first fields refers to plural fields. For this, the image coding apparatus according to Embodiment 1 can achieve a high compression rate.

In addition, it is preferable that the reference image control unit of the image coding apparatus is configured to determine, in the case where the current field to be coded is the second field and when the I-slice is located at the first end of the first field coded immediately before the current second field, that the current second field can refer to only the first field coded immediately before the current second field.

This structure enables synchronization between the timing of starting refresh on first fields and the timing of starting refresh on second fields. In this way, the image coding apparatus according to the present invention can stop error propagation in the second field immediately after the refresh performed on the first fields, and prevent an unnatural event that error propagation is stopped respectively in the adjacent fields at significantly different times, that is, at an interval equal to or greater than time corresponding to a field.

In addition, it is preferable that the reference image control unit of the image coding apparatus is configured to determine that at least one second field located backward of the first field including the I-slice at the second end can refer to only the first field coded immediately before at least one second field, the at least one second field being among second fields included in the predetermined number of fields.

This structure enables synchronization between the timing of ending refresh on the first fields and the timing of ending refresh on the second fields. In this way, the image coding apparatus according to the present invention can stop error propagation in the second field immediately after the refresh performed on the first fields, and prevent an unnatural event that error propagation is stopped respectively in the adjacent fields at significantly different times.

In addition, it is preferable that the image coding apparatus further includes: a skip judgment unit configured to judge whether or not the current field to be coded should be a skip picture that is regarded as the same as an immediately-preceding field in display order; and a skip determination unit configured to determine that the current field is a skip picture when (i) an immediately-preceding field is a skip picture and (ii) the skip judgment unit judges that the current field should be the skip picture in the case where the current field is the first field, and determine that the current field is a skip picture when the skip judgment unit judges that the current field is the skip picture in the case where the current field is the second field, and the coding unit of the image coding apparatus is configured to code the fields other than the fields determined to be the skip pictures by the skip determination unit.

With this structure, in coding processing performed by the image coding apparatus according to the present invention, a skip picture does not start from a first field including an I-slice but starts from a second field. For this, the firstly-appearing skip picture (the second field) refers to only the first field coded immediately before the firstly-appearing skip picture. Even when the first field is a skip picture, the skip picture refers to the skip picture that has referred to only the first field. In this way, in the case of preventing error propagation in first fields including an I-slice, the image coding apparatus according to the present invention can prevent error propagation using skip pictures in the same manner. In addition, a reference structure in the case of not using any skip pictures can be directly used for the fields other than the skip pictures. In other words, the image coding apparatus according to the present invention can prevent error propagation and reduce complexity in the reference structure of pictures.

In the case where the current field is the second field and when the skip determination unit determines that the current field is not a skip picture, it is preferable that the coding unit of the image coding apparatus codes the current second field with reference to either the first field coded immediately before the current second field or the second field coded immediately before the current second field among second fields coded before the current second field.

With this structure, it becomes possible to code each current second field with reference to an appropriate field selected among the two fields that are the first field coded immediately before the current second field or the second fields coded immediately before the current second field among the second fields coded before the current second field, thereby achieving a high compression efficiency.

It is preferable that the coding unit of the image coding apparatus is configured to code information indicating that the current field is the skip picture when the skip determination unit determines that the current field is the skip picture.

With this structure, information indicating that the current field is a skip picture is coded, and the coded information helps the decoding apparatus in error detection.

It is preferable that the coding unit of the image coding apparatus is configured to generate a stream which does not include data corresponding to the current field to be coded when the skip determination unit determines that the current field is the skip picture.

With this structure, the image coding apparatus according to the present invention can reduce coding bits compared to the case of coding the information indicating that the current field is the skip picture.

It is preferable that the first field of the image coding apparatus is a firstly-appearing field of a frame, and the second field is the next field of the frame.

With this structure where the firstly-appearing field in each frame includes an I-slice that provides a high resilience to transmission error, the image coding apparatus according to the present invention can reduce image quality deterioration due to transmission error in various applications such as random reproduction and high-speed reproduction in which (i) images are extracted in units of a frame and (ii) the firstly-appearing fields are used as the starting points for display.

The present invention can be implemented not only as the image coding apparatus like this, but also as an image coding method including the steps corresponding to the unique means included in the image coding apparatus, and also as a program causing a computer to execute the unique steps. As a matter of course, such program can be distributed through recording media such as CD-ROMs and communication media such as the Internet. In addition, the present invention can be implemented as an integrated circuit which achieves the functions of the image coding apparatus like this.

In view of the above, the present invention can provide an image coding apparatus and image coding method which prevent errors occurred in interlace video signals on transmission paths from propagating the following fields, and suppress deterioration in compression rate.

FURTHER INFORMATION ABOUT TECHNICAL BACKGROUND TO THIS APPLICATION

The disclosures of Japanese Patent Applications No. 2008-251395 filed on Sep. 29, 2008, No. 2008-251396 filed on Sep. 29, 2008, and No. 2009-218100 filed on Sep. 18, 2009 each including specification, drawings and claims are incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 18A is a diagram showing an exemplary arrangement of skip pictures and a reference structure used by the image coding apparatus according to Embodiment 4 of the present invention;

FIG. 18B is a diagram showing an exemplary arrangement of skip pictures and a reference structure used by the image coding apparatus according to Embodiment 4 of the present invention;

FIG. 19A is a diagram for illustrating prevention of error propagation according to Embodiment 4 of the present invention;

FIG. 19B is a diagram for illustrating prevention of error propagation according to Embodiment 4 of the present invention;

DESCRIPTION OF THE PREFERRED EMBODIMENTS

Embodiments of the present invention will be described below in detail with reference to the drawings.

Embodiment 1

In coding processing performed by an image coding apparatus according to Embodiment 1 of the present invention, only each of first fields includes an I-slice, and the position of a current I-slice is sequentially moved to each of the first fields, more specifically, the position of the current I-slice is shifted from a first end of the starting first field to a second end of the ending first field in a refresh cycle. Further, the first field refers to only the immediately-preceding first field. Thus, even in the case where data is lost in the first field, error propagation due to the data loss is stopped at least in the current refresh cycle.

Further, in coding processing performed by the image coding apparatus according to Embodiment 1, each of the second fields included in a cycle refers to only the immediately-preceding first field. For this, even in the case where data is lost in a second field that refers to only the immediately-preceding first field, error propagation due to data loss is stopped in the second field.

In this way, the image coding apparatus according to Embodiment 1 can prevent error propagation to the following fields.

Further, in coding processing performed by the image coding apparatus according to Embodiment 1 of the present invention, the second fields other than the aforementioned at least one second field refers to immediately-preceding consecutive two fields. For this, the image coding apparatus according to Embodiment 1 can achieve a high compression rate.

The following describes an example where the first fields are odd fields and the second fields are even fields.

First, a description is given of the structure of an image coding apparatus 100 according to Embodiment 1 of the present invention.

Figure 1:
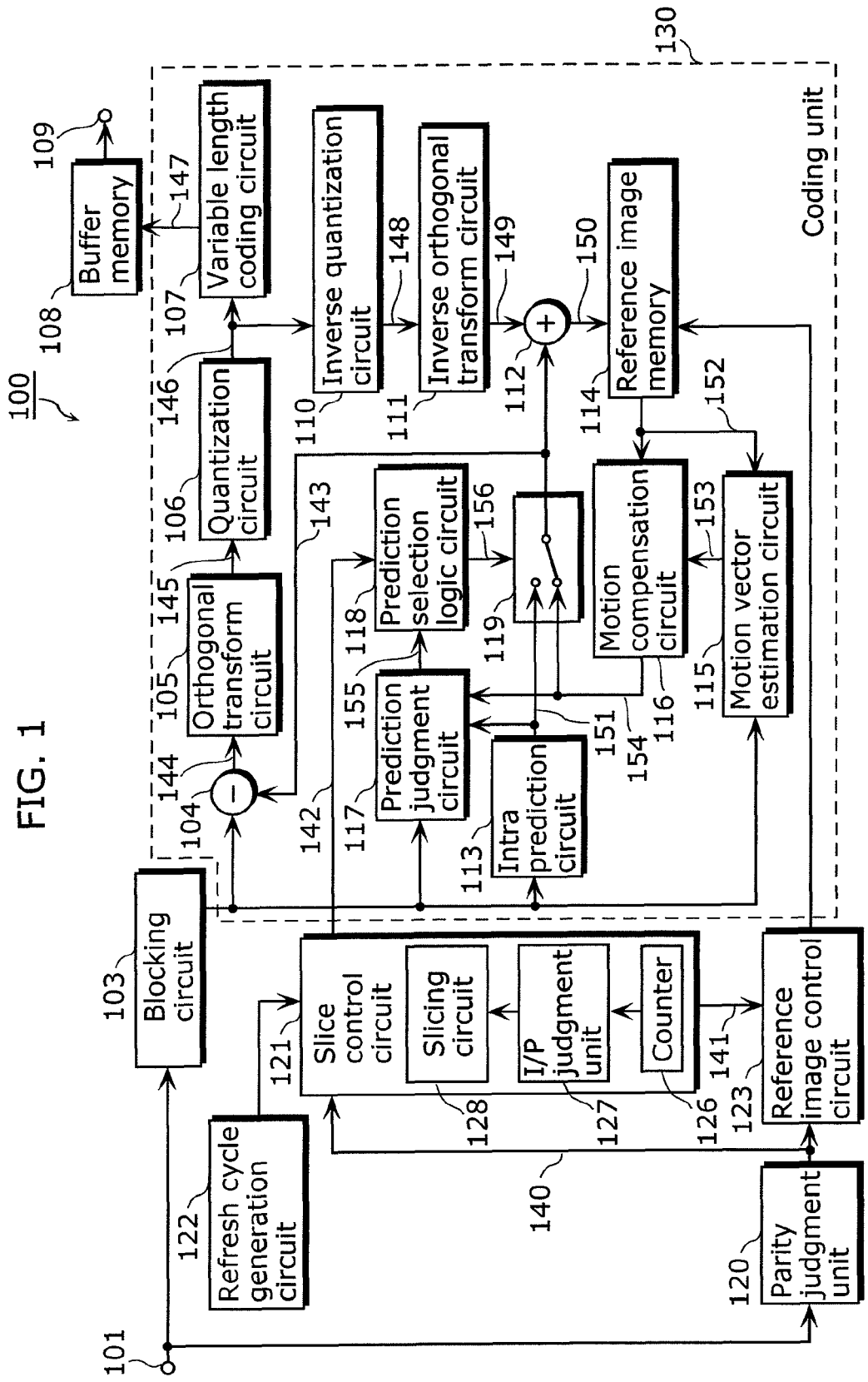
FIG. 1 is a block diagram showing the structure of an image coding apparatus according to Embodiment 1 of the present invention.

FIG. 1 is a block diagram showing the structure of the image coding apparatus 100 according to Embodiment 1 of the present invention.

The image coding apparatus 100 shown in FIG. 1 divides an image in a field into plural blocks each having a predetermined size, and selectively performs either intra predictive coding or inter predictive coding on the image data of each divided block.

Here, intra predictive coding is intended to perform predictive coding on a current block to be coded with reference to a block included in the field including the current block. On the other hand, inter predictive coding is intended to perform predictive coding on a current block to be coded with reference to a block included in a field coded before the field including the current block.

In addition, the image coding apparatus 100 is a video coding apparatus in conformity with H. 264 (by ITU)/MPEG-4 AVC or the like. The image coding apparatus 100 codes an interlace video signal inputted to a video input terminal 101 in units of a slice to generate a coded stream.

This image coding apparatus 100 includes, a video input terminal 101, a blocking circuit 103, a buffer memory 108, a coded data output terminal 109, a parity judgment circuit 120, a slice control circuit 121, a refresh cycle generation circuit 122, a reference image control circuit 123, and a coding unit 130. In addition, the slice control circuit 121 includes a counter 126, an I/P (I-slice and P-slice) judgment unit 127, and a slicing unit 128.

The video input terminal 101 receives an input of an interlace video signal that is a digital signal.

The blocking circuit 103 reorders the pixels of the digital video signal inputted to the video input terminal 101, and divides the pixels in each of the pictures into plural blocks.

The parity judgment circuit 120 checks the parity of a current field to be coded in the video signal inputted to the video input terminal 101 to judge whether the current field has the parity that allows coding using an I-slice or has the parity that allows coding only using slices other than I-slices (the parity identifies whether the current field is either a top field or a bottom field, or either an odd field or an even field). The following description is given of an example of performing control such that I-slices are included in odd fields. This is described in more detail. When the current field is an odd field, the parity judgment circuit 120 makes a judgment that the current field has a parity that allows coding using an I-slice. When the current field is an even field, the parity judgment circuit 120 makes a judgment that the current field has a parity that allows coding using only slices other than I-slices. In addition, the parity judgment circuit 120 generates parity status information 140 that is information indicating whether the current field is an odd field or an even field. In addition, the parity judgment circuit 120 notifies the skip determination unit 162, the I/P judgment unit 127, and the reference image control circuit 123 of the generated parity status information 140.

The refresh cycle generation circuit 122 generates field numbers incremented sequentially. These field numbers are reset on a refresh cycle basis.

The slice control circuit 121 divides each odd field into an I-slice and P-slices when the parity status information 140 generated by the parity judgment circuit 120 indicates an odd field. In addition, the slice control circuit 121 divides each even field into only P-slices without generating any I-slice when the parity status information 140 generated by the parity judgment circuit 120 indicates an even field.

Here, an I-slice is a slice including only blocks on which intra slice coding is performed using correlation between pixels within the slice. A P-slice is a slice including blocks on which either intra slice coding is performed using correlation between pixels within the slice or inter slice coding is performed using correlation with pixels outside the slice.

More specifically, inter slice coding includes coding (inter coding) using correlation between the pixels of a current slice in a current picture and the pixels of a slice in another picture. Inter slice coding may include coding using correlation between the pixels of a current slice in a picture and the pixels of another slice in the picture.

In addition, the slice control circuit 121 determines the positions of I-slices according to the field numbers generated by the refresh cycle generation circuit 122. More specifically, the slice control circuit 121 determines the positions of the I-slices in the respective odd fields in a refresh cycle such that a current I-slice in a current odd field is located at the refresh start position corresponding to the upper-most end of the starting odd field in the refresh cycle, the next current I-slice in the next current field is located at the position shifted downward from the previous position by one slice position, and such downward shifts of I-slices are repeated in sequence on an odd field basis until a current I-slice is located at the refresh end position corresponding to the lower most end of the ending odd field in the refresh cycle. In addition, the slice control circuit 121 determines the positions of the I-slices in the respective odd fields in each refresh cycle such that a sequence of downward shifts of I-slices is repeated for the refresh cycle. Here, the upper-most end of a field is the portion which is firstly coded, and the lower-most end of the field is the portion which is coded lastly.

In addition, the slice control circuit 121 sets a slice mode selection signal 142 to an I-slice status according to a timing of generation of an I-slice, and sets a field refresh request signal 141 to a refresh request status according to a predetermined field number.

The counter 126 counts the number of blocks or slices to be coded to measure the position of a current block or slice to be coded in a current picture. In addition, the counter 126 notifies the I/P judgment unit 127 of the number of blocks or slices counted up.

The I/P judgment unit 127 judges whether the current slice included in the current field is an I-slice or a P-slice. More specifically, the I/P judgment unit 127 judges that the current slice is an I-slice when the parity judgment circuit 120 judges that the current field is an odd field and the counter 126 detects that the current position in the field is for an I-slice. Otherwise, the I/P judgment unit 127 judges that the current slice is a P-slice.

In this way, the I/P judgment unit 127 judges the positions of I-slices such that the position of a current I-slice is sequentially shifted from the upper-most end of the starting odd field to the lower-most end of the ending odd field. In addition, the I/P judgment unit 127 judges the positions of the I-slices such that such downward shifts starting from the upper-most end of a starting odd field and ending with the lower-most end of an ending odd field is repeated for each predetermined cycle.

In addition, the I/P judgment unit 127 notifies the slicing unit 128 and the coding unit 130 of the judgment result.

The slicing unit 128 divides the current field into an I-slice and P slices based on the judgment result made by the I/P judgment unit 127. In addition, the slicing unit 128 determines the size of a current slice depending on whether the current slice is an I-slice or a P-slice. In addition, the slicing unit 128 notifies the coding unit 130 of information about the divided slices.

The reference image control circuit 123 selects a reference picture for the current field. Here, a reference picture is a picture (or a field) referred to in inter coding. Inter coding is performed using correlation between the pixels in a current block to be coded and pixels included in a reference picture.

More specifically, when a current field to be coded is an odd field, the reference image control circuit 123 determines that the current odd field can refer to only the immediately-preceding odd field (that is the odd field coded immediately before the current odd field among the odd fields coded before the current odd field). Here, the field referred to is the reference field for the current odd field to be coded. On the other hand, when a current field to be coded is an even field, the reference image control circuit 123 determines that one of the even fields in a current refresh cycle can refer to only the immediately-preceding odd field (that is the odd field coded immediately before the current even field). Here, the field referred to is the reference field for the current even field to be coded. For the other even fields in the refresh cycle, the reference image control circuit 123 determines that each of these even fields can refer to the two consecutive fields (the odd field and the even field coded before the current even field by one and two fields) immediately preceding the even field. Here, the fields referred to are the reference fields for the even field to be coded. This is described in more detail. When the parity status information 140 generated by the parity judgment circuit 120 indicates that the current field is an odd field, the reference image control circuit 123 generates a memory address of the reference image corresponding to the field preceding the current field by two fields. When the parity status information 140 indicates that the current field is an even field, and the field refresh request signal 141 outputted by the slice control circuit 121 indicates a refresh request status, the reference image control circuit 123 generates an address indicating the field position of the reference image stored in the field preceding the current field by a field. In the other cases, the reference image control circuit 123 generates addresses indicating the field positions of the reference images stored in the fields preceding the current field by one and two fields.

The coding unit 130 codes the video signals inputted to the video input terminal 101, based on (i) the slice classifications (classification of each slice into an I-slice or a P-slice) made by the I/P judgment unit 127, (ii) the slice sizes determined by the slicing unit 128, and the reference pictures selected by the reference image control circuit 123 so as to generate a coded stream, and output the coded stream to the coded data output terminal 109.

More specifically, the coding unit 130 performs intra slice coding on all the blocks included in an I-slice. In addition, the coding unit 130 performs intra slice coding on some blocks included in a P-slice and performs inter slice coding on the other blocks included in the P-slice with reference to blocks included in a reference field determined by the reference image control circuit 123.

The coding unit 130 includes a prediction error calculation circuit 104, an orthogonal transform circuit 105, a quantization circuit 106, a variable length coding circuit 107, an inverse quantization circuit 110, an inverse orthogonal transform circuit 111, an adder circuit 112, an intra prediction circuit 113, a reference image memory 114, a motion vector estimation circuit 115, a motion compensation circuit 116, a prediction judgment circuit 117, a prediction selection logic circuit 118, and a selector circuit 119.

The prediction error calculation circuit 104 calculates a difference pixel value 144 which is a difference between image data divided in units of a block by the blocking circuit 103 and prediction image data 143 (that is either intra prediction image data 151 or motion prediction image data 154) selected by the selector circuit 119 that is described later.

The orthogonal transform circuit 105 performs orthogonal transform on the difference pixel value 144 calculated by the prediction error calculation circuit 104 to generate a coefficient signal 145.

The quantization circuit 106 quantizes the coefficient signal 145 generated by the orthogonal transform circuit 105 to generate a quantized-coefficient signal 146.

The variable length coding circuit 107 performs variable length coding on the quantized-coefficient signal 146 generated by the quantization circuit 106 to generate coded data 147.

The buffer memory 108 temporarily stores the coded data 147 generated by the variable length coding circuit 107 and adjusts the speed of externally outputting the coded data such that the coded data is outputted at a data processing speed within a predetermined range.

Through the coded data output terminal 109, the coded data 147 read from the buffer memory 108 is outputted as a coded stream.

The inverse quantization circuit 110 performs inverse quantization on the quantized-coefficient signal 146 generated by the quantization circuit 106 to generate a coefficient signal 148.

The inverse orthogonal transform circuit 111 performs inverse orthogonal transform on the coefficient signal 148 generated by the inverse quantization circuit 110 to generate the difference pixel value 149.

The adder circuit 112 adds the difference pixel value 149 generated by the inverse orthogonal transform circuit 111 and the prediction image data 143 (that is either the intra prediction image data 151 or the motion prediction image data 154) selected by the selector circuit 119 to generate decoded image data 150.

The intra prediction circuit 113 performs intra prediction in units of a block divided from the image data by the blocking circuit 103 to generate intra prediction image data 151.

The reference image memory 114 stores the decoded image data 150 generated by the adder circuit 112. In addition, the reference image memory 114 outputs the reference image data 152 stored at the address generated by the reference image control circuit 123 to the motion vector estimation circuit 115 and the motion compensation circuit 116.

The motion vector estimation circuit 115 generates a motion vector value 153 for the image data in each of the blocks divided by the blocking circuit 103, using the reference image data 152 outputted by the reference image memory 114.

The motion compensation circuit 116 performs motion compensation using the motion vector value 153 outputted by the motion vector estimation circuit 115 and the reference image data 152 outputted by the reference image memory 114 to generate motion prediction image data 154.

The prediction judgment circuit 117 compares (i) the intra-predicted image data 151 generated by the intra prediction circuit 113, (ii) the motion-predicted image data 154 generated by the motion compensation circuit 116, and (iii) the image data of block divided by the blocking circuit 103, and generates a prediction judgment signal 155 for selection of either the intra-predicted image data 151 or the motion-predicted image data 154.

The prediction selection logic circuit 118 outputs a selection signal 156 for selection of intra prediction when the slice mode selection signal 142 generated by the slice control circuit 121 indicates an I-slice status. When the slice mode selection signal 142 does not indicate an I-slice status, the prediction selection logic circuit 118 generates a selection signal 156 for selection of prediction according to the prediction judgment signal 155 generated by the prediction judgment circuit 117.

The selector circuit 119 selectively outputs either the intra-predicted image data 151 generated by the intra prediction circuit 113 or the motion-predicted image data 154 generated by the motion compensation circuit 116 according to the selection signal 156 generated by the prediction selection logic circuit 118.

Next, a description is given of operations performed by the image coding apparatus 100 according to Embodiment 1 of the present invention.

Figure 2:
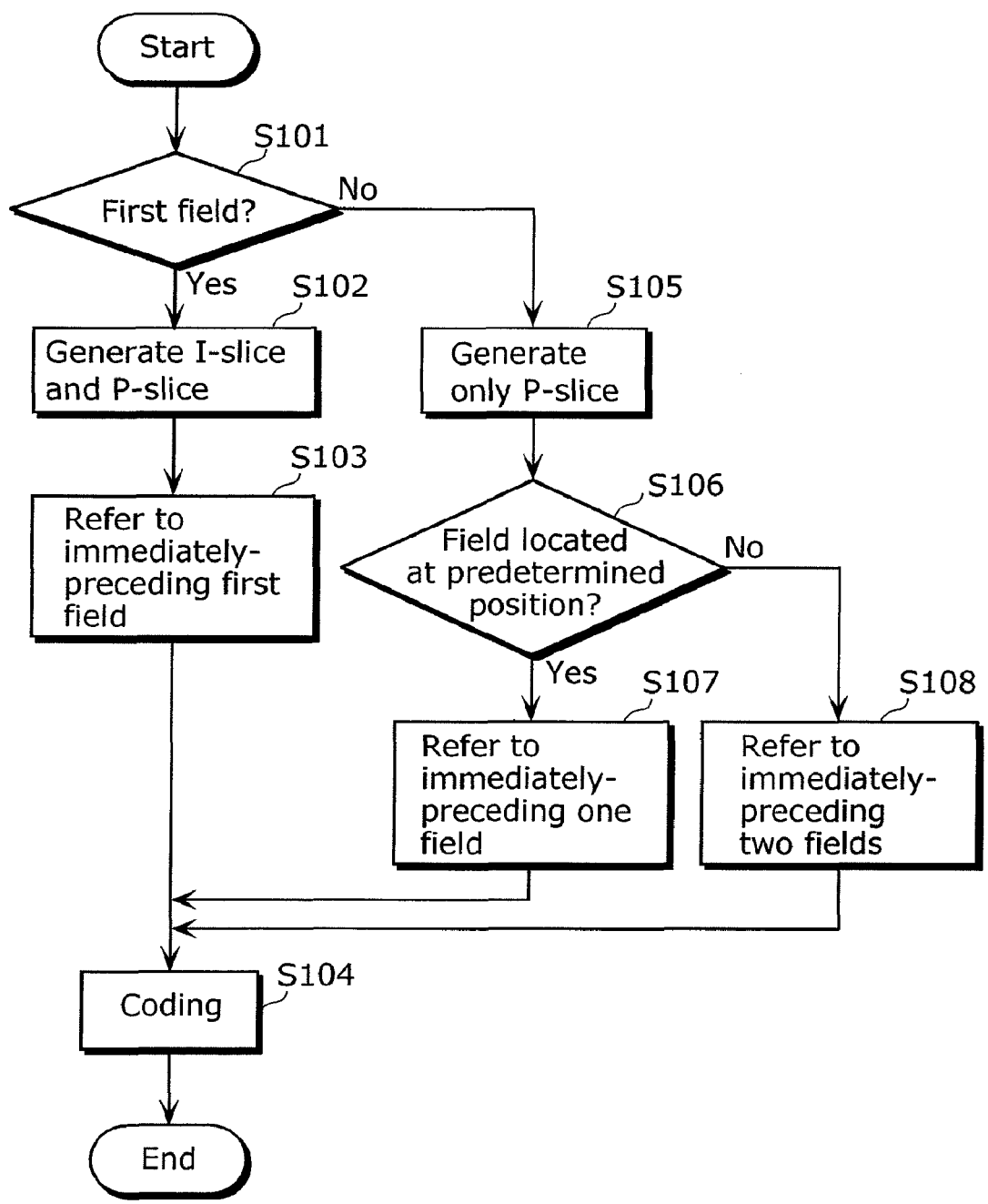
FIG. 2 is a flowchart showing coding processing performed by the image coding apparatus according to Embodiment 1 of the present invention.

FIG. 2 is a flowchart showing coding processing performed by the image coding apparatus 100.

Figure 3:
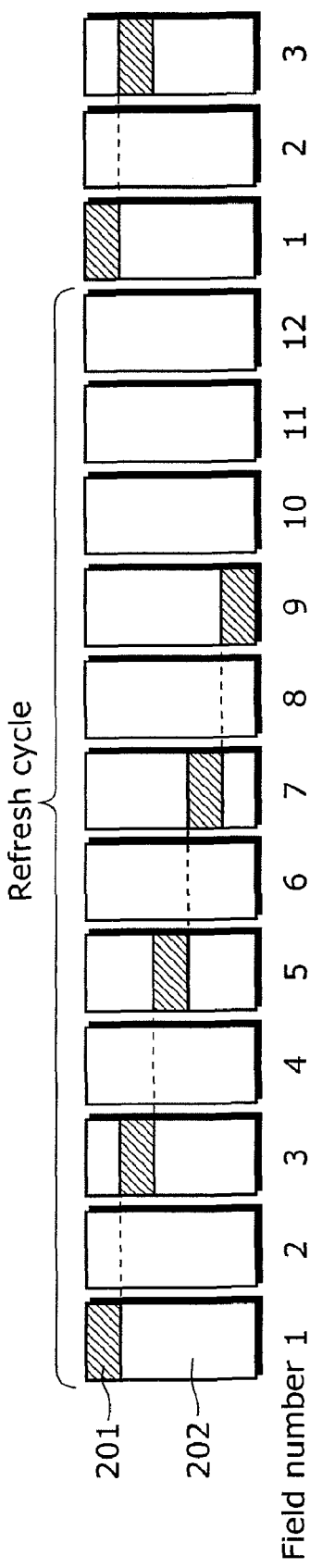
FIG. 3 is a diagram showing the positions of I-slices processed by the image coding apparatus according to Embodiment 1 of the present invention.

In addition, FIG. 3 is a diagram showing the positions of I-slices determined by the slice control circuit 121 of the image coding apparatus 100 according to Embodiment 1 of the present invention.

First, the parity judgment circuit 120 judges whether a current field to be coded is an odd field (first field) or an even field (second field) (S101).

When the current field is an odd field (Yes in S101), the slice control circuit 121 generates an I-slice 201 and P-slices 202 in the odd field (S102). In addition, the slice control circuit 121 sequentially shifts the position of a current I-slice 201 in a current odd field to each of the odd fields allowed to include an I-slice.

More specifically, as shown in FIG. 3, the slice control circuit 121 generates an I-slice 201 at the top position of the field when the field number is 1. In addition, the slice control circuit 121 shifts the position of a current I-slice 201 in the current odd field (assigned with field number 1) in a downward direction by the width of the I-slice 201, that is, the slice control circuit 121 shifts the position of the current I-slice from the current odd field to the next odd field (assigned with field number 3). The slice control circuit 121 repeats such positional shift of a current I-slice 201 until the current I-slice 201 is finally shifted to the bottom of an ending odd field after a sequence of shifts on an odd field basis. After the slice control circuit 121 shifts the position of the current I-slice 201 to the bottom of the ending odd field, the slice control circuit 121 shifts the position of the current I-slice 201 to the top of the next starting odd field, and repeats such processing.

Here, a refresh cycle is the period from when a current I-slice 201 is located at the top of a starting odd field and to when a current I-slice 201 is located at the bottom of an ending odd field.

In addition, an I-slice 201 may cover the range corresponding to the blocks in a single line, or may cover the range corresponding to the blocks in plural lines. Further, a line may be divided into plural slices, and one of the divided slices may be an I-slice 201.

In FIG. 3, an odd field (assigned with field number 11) that does not include any I-slice 201 is present after the odd field (assigned with field number 9) in which an I-slice is located at the bottom. However, the odd field (assigned with field number 11) may not be present.

On the other hand, the current field is an even field (No in S101), the slice control circuit 121 generates only P-slices in each even field (S105). In FIG. 3, 202 is assigned for the position of a slice which becomes a P slice. In reality, one or more P-slices are included in the position assigned with 202.

Figure 4:
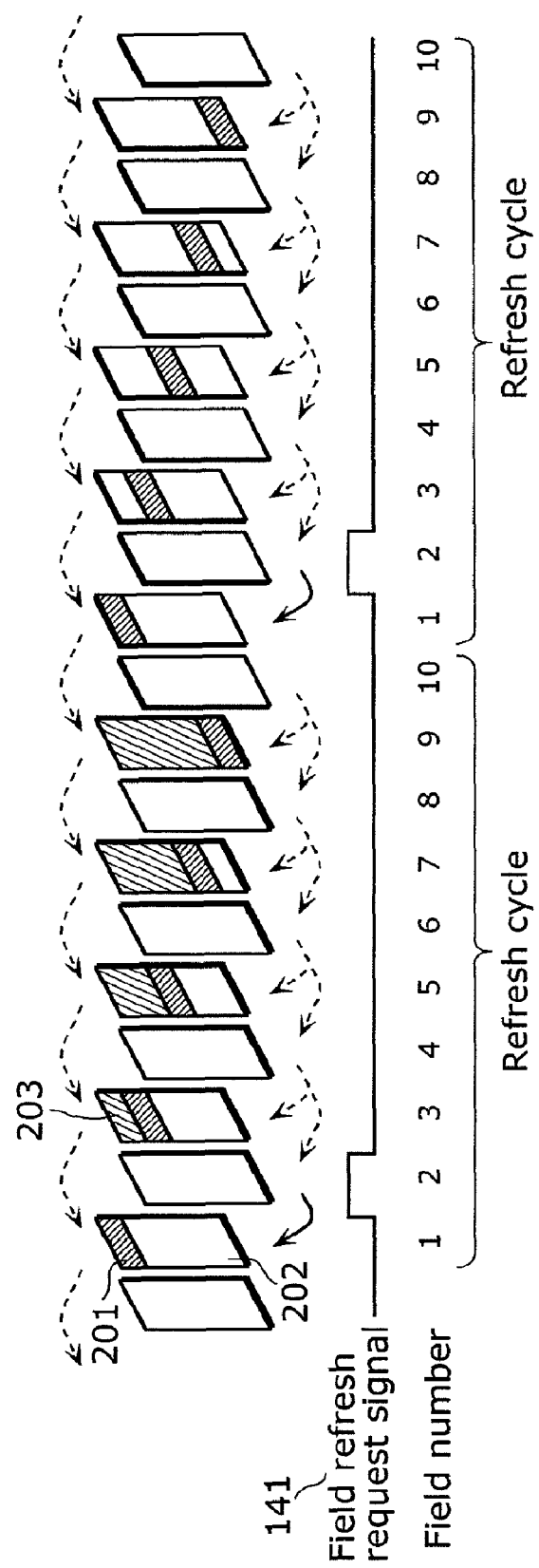
FIG. 4 is a diagram showing the structures of the slices and reference fields used by the image coding apparatus according to Embodiment 1 of the present invention.

FIG. 4 is a diagram showing the structures of the slices and reference fields used by the image coding apparatus 100 according to Embodiment 1 of the present invention. In FIG. 4, it is assumed that odd fields (first fields) are top fields, and that even fields (second fields) are bottom fields.

As shown in FIG. 4, in the case where a current field is assigned with an odd field number (Yes in S101), the reference image control circuit 123 determines that the current field can refer to only the field preceding the current field by two fields (that is, the immediately-preceding odd field as the reference field) (S103). For example, the odd field assigned with field number 3 refers to only the odd field assigned with field number 1.

In addition, in the case where a current field is assigned with an even field number (Yes in S101) and the field refresh request signal 141 generated by the slice control circuit 121 is set to the high level (Yes in S106), the reference image control circuit 123 determines that the even field can refer to only the immediately-preceding one field (S107). More specifically, the even field assigned with field number 2 refers to only the immediately-preceding odd field assigned with field number 1.

On the other hand, in the case where a current field is assigned with an even field number (Yes in S101) and the field refresh request signal 141 is set to the low level (No in S106), the reference image control circuit 123 determines that the current even field can refer to only the two consecutive fields immediately preceding the current even field (S108). For example, the even field assigned with field number 4 refers to the odd field assigned with field number 3 and the even field assigned with field number 2.

Here, the slice control circuit 121 sets the field refresh request signal 141 to the high level (corresponding to a refresh request status) in the case where the current even field is present at a predetermined position (that is also referred to as an exceptional even field). In the other cases, the slice control circuit 121 sets the field refresh request signal 141 to the low level. This is described in more detail. The slice control circuit 121 sets the field refresh request signal 141 to the high level when an I-slice is present at the top of an odd field immediately preceding the current even field in process. In the other cases, the slice control circuit 121 sets the field refresh request signal 141 to the low level.

Lastly, the coding unit 130 codes the current field with reference to the reference field determined by the reference image control circuit 123 (S104).

As described above, in coding processing performed by the image coding apparatus 100 according to Embodiment 1 of the present invention, the position of a current I-slice 201 is sequentially shifted from the top of a starting odd field to the bottom of an ending odd field during a refresh cycle. Here, the blocks in each I-slice 201 are coded using intra slice coding. Therefore, these blocks are coded in an error-refreshed status without any influence of errors occurred in the fields located in the forward direction. Further, each odd field refers to only the immediately-preceding odd field. For this, the data located at all the fields is refreshed on a refresh cycle basis. Therefore, the image coding apparatus 100 can stop error propagation due to data loss at least in the current refresh cycle even when data is lost in the current odd field.

In addition, in the case of an interlace video signal, fields having the same parity status information 140 are closely correlated at stationary portions in a video. In other words, a current odd field and the immediately-preceding odd field at a stationary portion are closely correlated. Thus, even when only the immediately-preceding odd field can be used as the reference field for the current odd field, the decrease in the resulting compression rate is small. Accordingly, the image coding apparatus 100 can reduce, to the minimum, the deterioration in the compression rate of an interlace video signal with small motion.

In coding processing performed by the image coding apparatus 100, an exceptional even field (the field assigned with field number 2) included in a refresh cycle refers to only the immediately-preceding odd field. As described above, in each odd field, all the slices are refreshed on a refresh cycle basis. For this, the image coding apparatus 100 can stop error propagation due to data loss in the exceptional even field even when data is lost in an even field. Further, in coding processing performed by the image coding apparatus 100, the even fields other than the exceptional even field included in the refresh cycle refers to the immediately-preceding two consecutive fields. In general, the greater the number of reference images (reference fields), the higher the compression rate in coding. Therefore, the image coding apparatus 100 can achieve a high compression rate by not restricting the numbers of reference fields for the even fields other than the exceptional even fields.

Further, in coding processing performed by the image coding apparatus 100, each of even fields do not include any I-slice. In general, an I-slice requires coding bits (bit counts) 2 to 10 times greater than a P slice. Therefore, the image coding apparatus 100 can achieve coding bits reduced from the coding bits required in the case where every field includes an I-slice.

The first P slice 203 shown with diagonal lines in FIG. 4 is a P slice refreshed within a period from the starting field to the field immediately before the current field in the current refresh cycle. Here, in order to reliably prevent error propagation on a refresh cycle basis, it is preferable that each of reference slices which are used to perform intra prediction on the respective field is a slice refreshed within a period from the starting field to the field immediately before the current field in the current refresh cycle. In other words, it is preferable that the slice is either a refreshed first P-slice 203 in a previous field or an I-slice 201 present between the starting field to the current field in the current refresh cycle.

Figure 5:
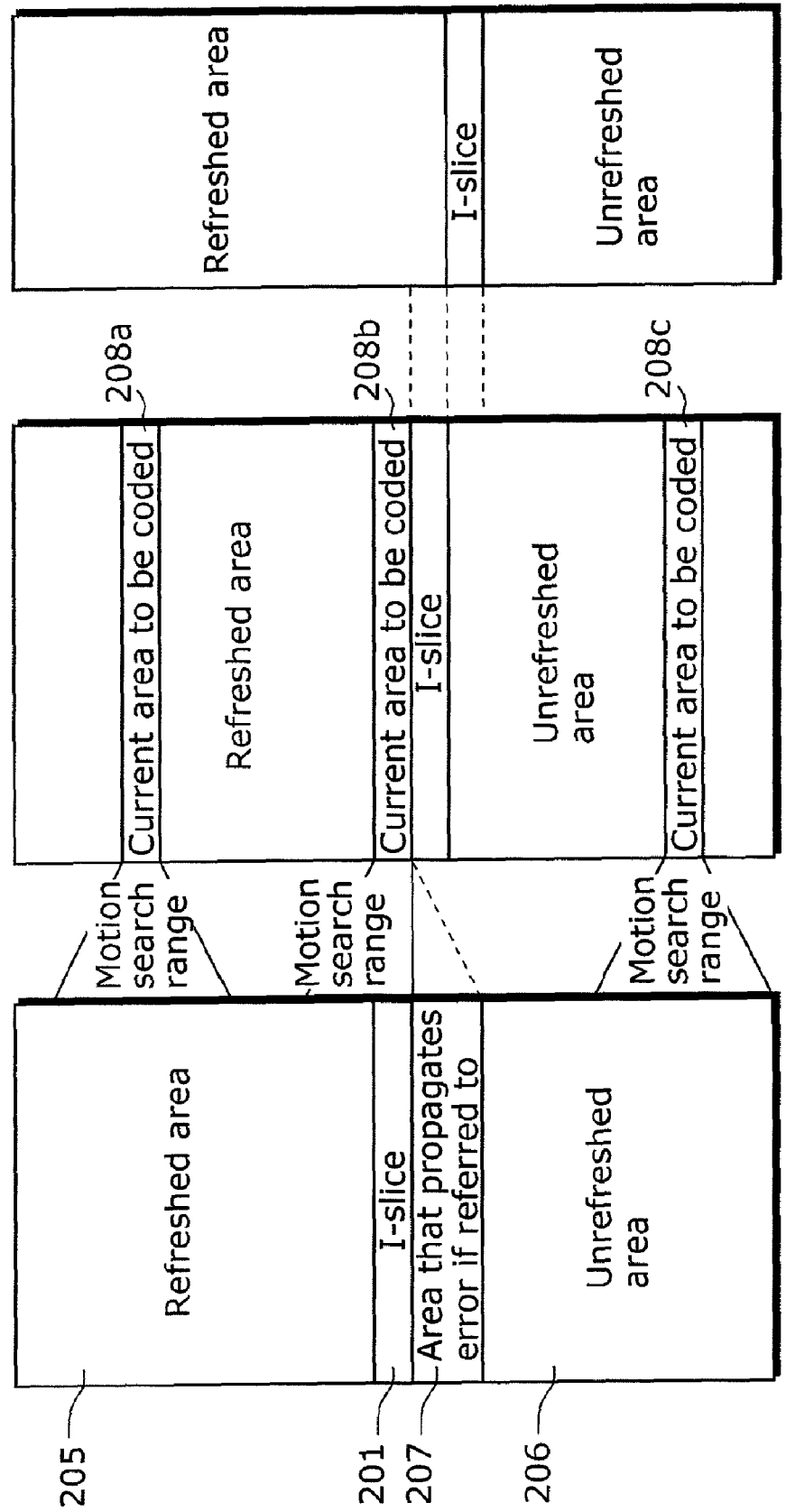
FIG. 5 is a diagram showing slices referred to by P-slices processed by the image coding apparatus according to Embodiment 1 of the present invention.

FIG. 5 is a diagram showing reference slices for P-slices 202. FIG. 5 shows three odd fields that are temporally consecutive.

As shown in FIG. 5, each odd field includes (i) a refreshed area 205 including a first P-slice 203 refreshed between the starting field and the immediately-preceding field in the current refresh cycle, (ii) an I-slice 201, and (iii) a P-slice unrefreshed between the starting field and the immediately-preceding field in the current refresh cycle.

As shown in FIG. 5, in the case where current areas to be coded 208a, 208b and 208c in a current odd field are coded, the current areas 208a, 208b and 208c refer to the slices within the motion search areas predetermined respectively for the areas 208a, 208b and 208c in the immediately-preceding odd field.

Here, the reference image control circuit 123 selects reference slices for the current areas 208a and 208b included in a refreshed area 205 from among the first P-slice 203 and the I-slice 201 included in the refreshed area 205.

More specifically, in an exemplary case where the image coding apparatus 100 selects a reference slice for the current area 208b present at the lower end of the refreshed area 205 within the predetermined motion search range, the P-slice 202 in the area 207 of an unrefreshed area 206 may be selected. If the current area 208b refers to the P-slice 202 in the area 207, the error is inevitably propagated in the current area 208b.

On the other hand, the reference image control circuit 123 can prevent such error propagation by restricting the reference slices for the current area 208b to the first P-slice 203 and I-slice 201 included in the motion search range. In this way, the image coding apparatus 100 can reliably stop error propagation on a refresh period basis.

In general, in most cases, P-slices 202 refer to co-located slices in fields temporally close to the P-slices 202. Thus, even when reference slices for the inter predictive coding of the respective fields are not restricted to the first P slices 203 and the I-slices 201, it is unlikely that a previous error is propagated to the fields following the field that includes the I-slice with a pixel co-located with the pixel with an error. In the case of prioritizing processing simplicity to error propagation prevention, it is also good to provide an implementation in which reference slices for the error-code target areas 208a and 208b included in the refreshed area 205 can be selected not only from the first P-slice 203 and the I-slice 201 included in the refreshed area 205 but also from the other slices.

The above descriptions have been given of the image coding apparatus 100 according to Embodiment 1 of the present invention, but the present invention is not limited to Embodiment 1.

For example, Embodiment 1 describes that each exceptional even field is a field located immediately after an odd field including an I-slice at the upper end. However, the position of an exceptional even field may be any other position.

Figure 6:
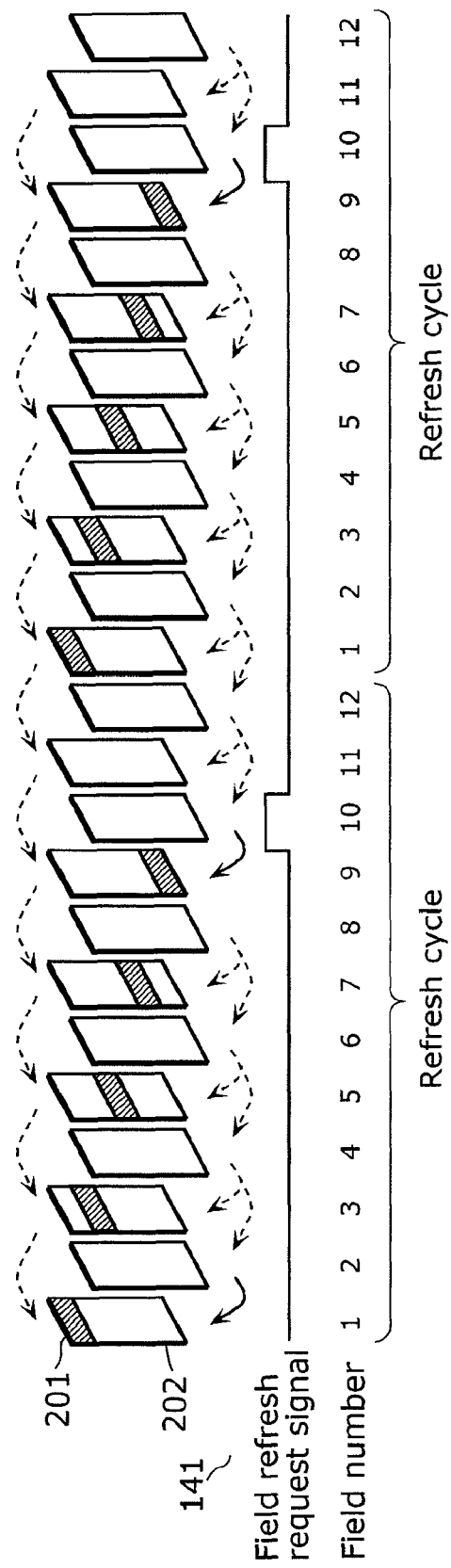
FIG. 6 is a diagram showing a variation for the structures of the slices and reference fields used by the image coding apparatus according to Embodiment 1 of the present invention.

FIG. 6 is a diagram showing a variation for the structures of the slices and reference fields used by the image coding apparatus according to Embodiment 1 of the present invention. As shown in FIG. 6, in the case where the current field has an even field number and the I-slice in the immediately-preceding odd field is present at the lower end, the slice control circuit 121 may set the field refresh request signal 141 at the high level. According to this, the reference image control circuit 123 determines only the immediately-preceding field to be the reference field for the even field. In the exemplary case shown in FIG. 6, the even field assigned with field number 10 is the exceptional even field.

Figure 16:
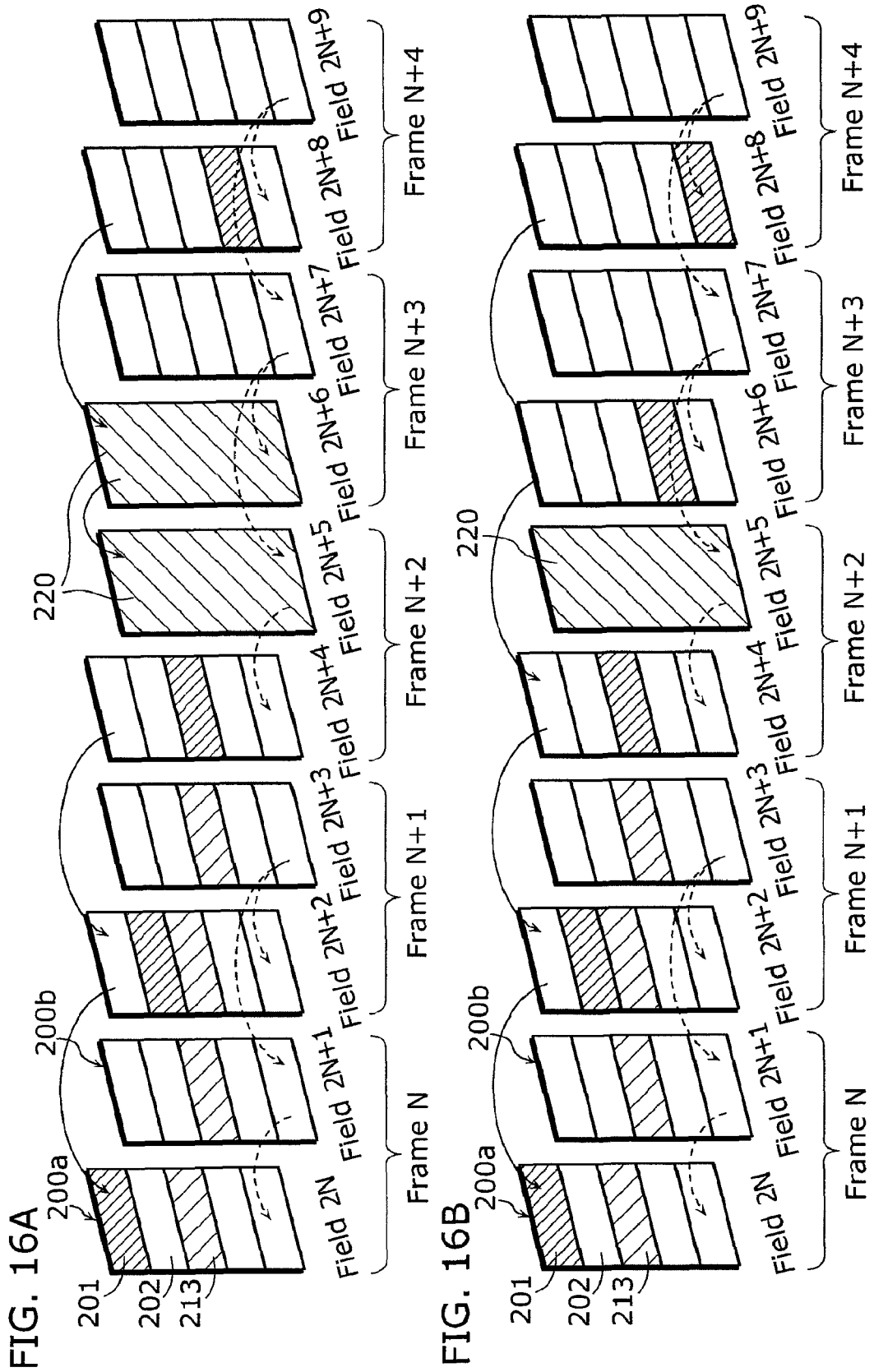
FIG. 16A is a diagram for illustrating prevention of error propagation according to Embodiment 3 of the present invention.
FIG. 16B is a diagram for illustrating prevention of error propagation according to Embodiment 3 of the present invention.

Further, the image coding apparatus 100 may determine that one of the current even field located immediately after the odd field including an I-slice at the lower end and the even fields following the current even field is the exceptional even field. For example, the image coding apparatus 100 may determine that the even field assigned with field number 12 shown in FIG. 16 is the exceptional even field.

Further, the exceptional even field may be an even field located at any other position.

Figure 7:
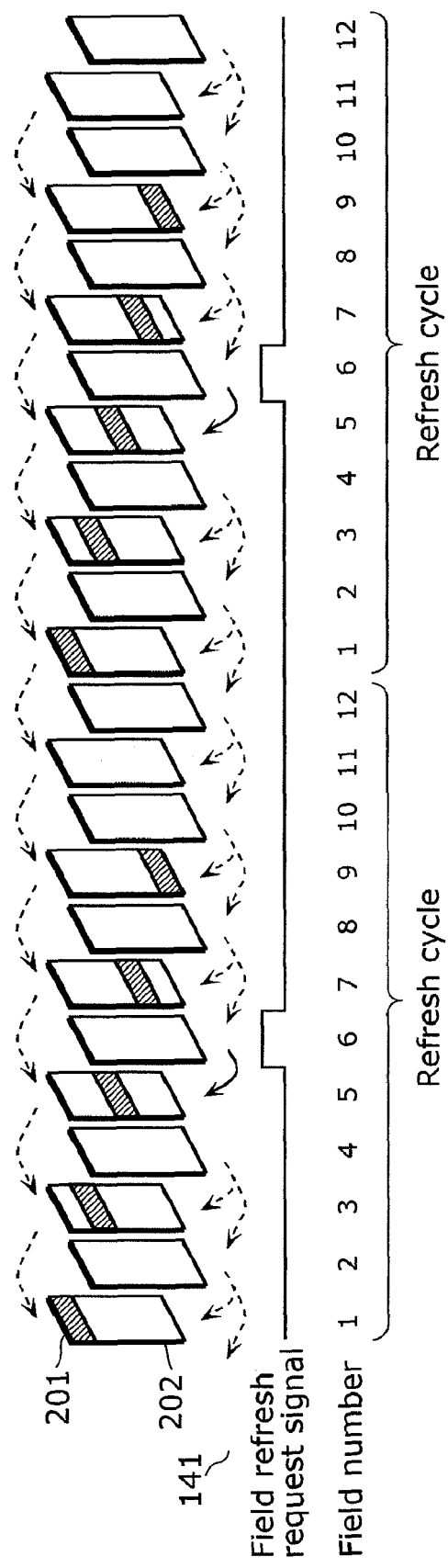
FIG. 7 is a diagram showing a variation for the structures of the slices and reference fields used by the image coding apparatus according to Embodiment 1 of the present invention.

FIG. 7 is a diagram showing a variation for the structures of the slices and reference fields used by the image coding apparatus 100 according to Embodiment 1 of the present invention. For example, as shown in FIG. 7, the image coding apparatus 100 may determine that the even field assigned with field number 6 located around the midpoint of a refresh period is the exceptional even field.

It has been described that each odd field includes an I-slice and that each even field includes P-slices only. However, each even field may include an I-slice and each odd field may include P slices only. In other words, the odd fields and the even fields in Embodiment 1 may be exchanged.

In addition, it has been described that odd fields (first fields) are top fields, and even fields (second fields) are bottom fields. However, odd fields may be bottom fields and even fields may be top fields.

Figure 8:
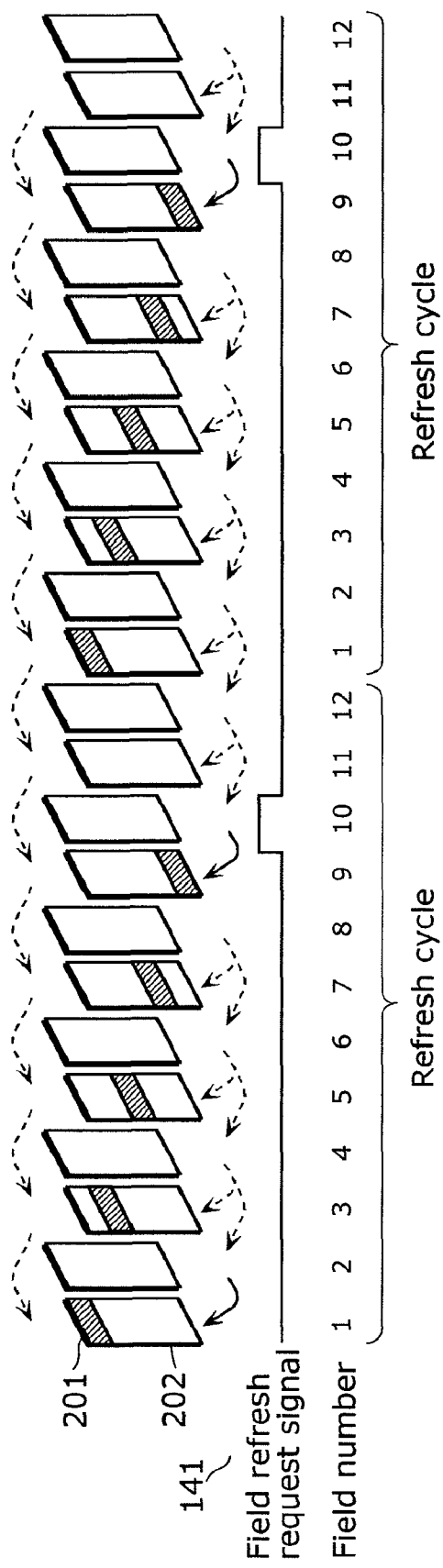
FIG. 8 is a diagram showing a variation for the structures of the slices and reference fields used by the image coding apparatus according to Embodiment 1 of the present invention.

FIG. 8 is a diagram showing a variation for the structures of the slices and reference fields used by the image coding apparatus 100 according to Embodiment 1 of the present invention. For example, as shown in FIG. 8, odd fields may be bottom fields and even fields may be top fields.

In addition, it has been described that odd fields refer to the immediately-preceding odd fields. However, odd fields may refer to any other preceding odd fields.

In addition, it has been described that each of the even fields other than exceptional even fields refers to two fields. However, each of the even fields other than exceptional even fields may refer to three fields. Otherwise, each of the even fields other than the exceptional even fields may refer to a single field other than the immediately-preceding field. For example, each of the even fields other than the exceptional even fields may refer to only a field that precedes the current field by two fields (the field is the immediately-preceding even field).

In addition, it has been described that an exceptional even field is included in each refresh cycle. However, two or more exceptional even fields may be included in each refresh cycle.

In addition, it has been described that the position of a current I-slice included in a current odd field in a current refresh cycle is shifted from the upper end of the starting odd field to the lower end of the ending odd field. However, the position of a current I-slice included in a current odd field in a current refresh cycle may be shifted from the lower end of the starting odd field to the upper end of the ending odd field in a current refresh cycle. In other words, it is only necessary that the position of a current I-slice included in a current odd field in a current refresh cycle is shifted from a first end of the starting odd field to a second end of the ending odd field in a current refresh cycle.

It is noted here that the image coding standards such as MPEG-2 and MPEG-4 do not allow co-existence of an I-slice and a P-slice in a single field. In this case, it is only necessary to generate two types of P-slices that are (i) special P-slices for coding using only correlation between pixels within each slice and (ii) normal P-slices for coding using either correlation between pixels within each slice or correlation between pixels in a slice and pixels in another slice, and to perform coding using the special P-slices instead of I-slices in the present invention.

Embodiment 2

Embodiment 1 has described an exemplary case where every P-slice 202 included in a field refers to only the immediately-preceding first field. In coding processing performed by an image coding apparatus according to Embodiment 2 of the present invention, the first P-slice 203 included in a refreshed area 205 among plural P-slices 202 included in a first field refers to only the immediately-preceding first field, and the second P-slice 204 included in an unrefreshed area 206 refers to two consecutive fields immediately preceding the current field.

The structure of the image coding apparatus 100 according to Embodiment 2 of the present invention is the same as in FIG. 1. Thus, the following descriptions are given focusing on the differences from Embodiment 1.

Figure 9:
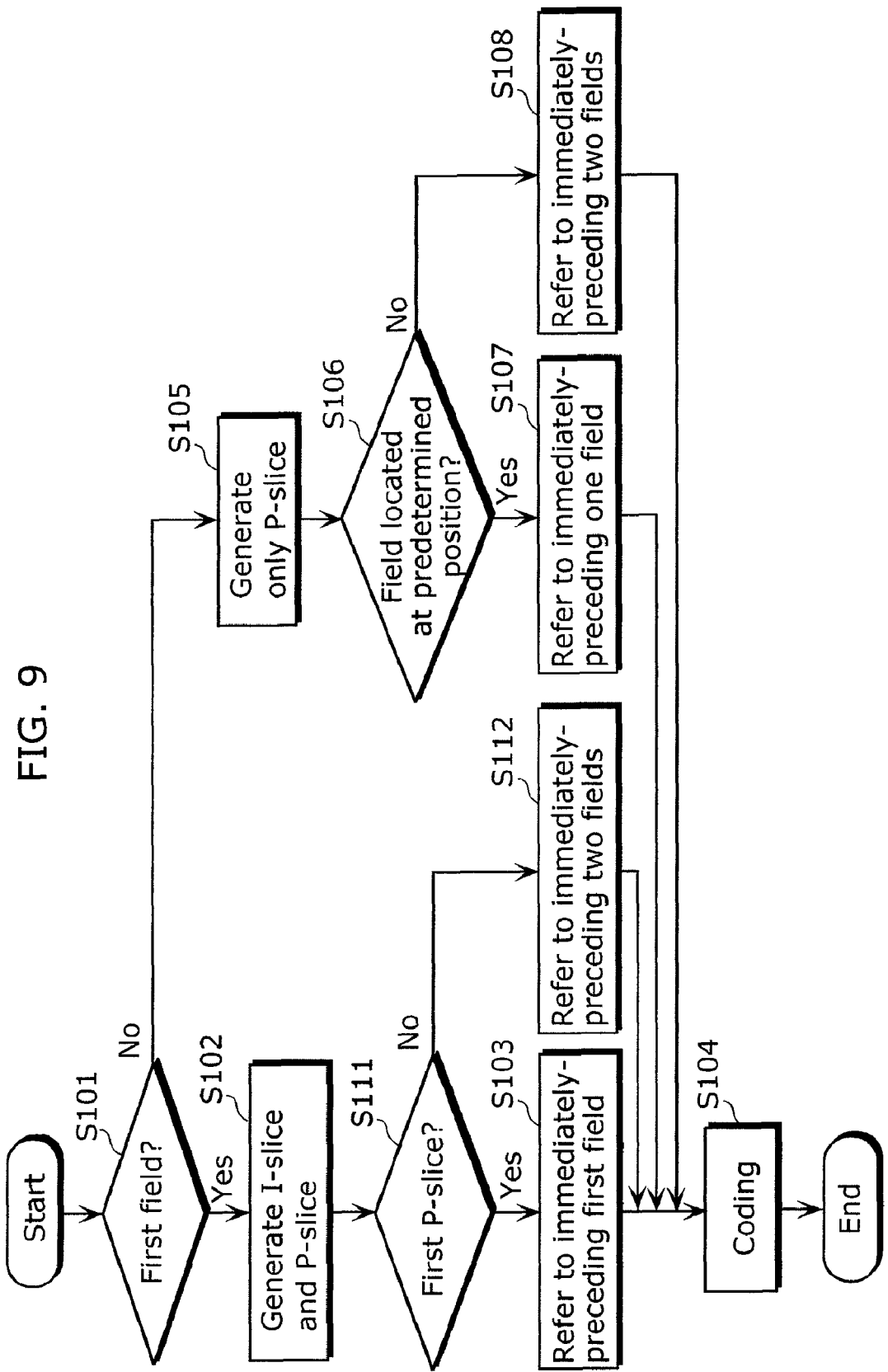
FIG. 9 is a flowchart showing coding processing performed by an image coding apparatus according to Embodiment 2 of the present invention.

FIG. 9 is a flowchart showing coding processing performed by an image coding apparatus 100 according to Embodiment 2 of the present invention.

Figure 10:
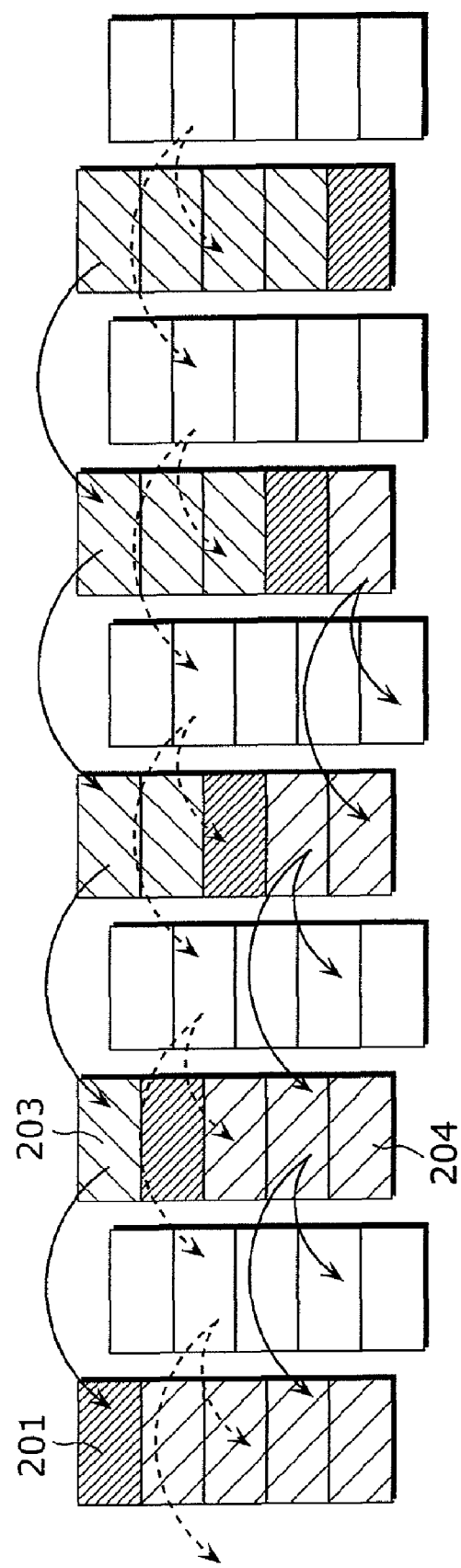
FIG. 10 is a diagram showing the structures of the slices and reference fields used by the image coding apparatus according to Embodiment 2 of the present invention.

FIG. 10 is a diagram showing the structures of the slices and reference fields used by the image coding apparatus 100 according to Embodiment 2 of the present invention. In FIG. 10, it is assumed that odd fields (first fields) are top fields, and that even fields (second fields) are bottom fields.

The processing of Step S102 and the following Steps in FIG. 9 is different from the corresponding steps in Embodiment 1.

As shown in FIG. 10, when a current field to be coded is a first field (Yes in S101) and a current slice to be coded is a first P-slice 203 (Yes in S111), the reference image control circuit 123 determines that the current first P-slice can refer to only the first field coded immediately before the current first field among the first fields coded before the current first field, that is the reference picture (S103).

On the other hand, when a current field to be coded is a first field (Yes in S101) and a current slice to be coded is a second P-slice 204 (No in S111), the reference image control circuit 123 determines that the current second P-slice can refer to plural fields as the reference fields. More specifically, the reference image control circuit 123 determines that the current second P-slice 204 can refer to the two fields preceding the current field by one and two fields, which are the reference fields (S112).

Here, the first P-slice 203 is a P-slice 202 located closer to the upper end than the I-slice 201. The second P-slice 204 is the P-slice 202 located closer to the lower end than the I-slice 201. It is assumed here that a current I-slice 201 included in a current first odd field is sequentially shifted from the first end of the starting odd field to the second end of the ending odd field. In this case, each first P-slice 203 is a P-slice 202 located closer to the first end than the I-slice 201, and each second P-slice 204 is a P-slice 202 located closer to the second end than the I-slice 201.

As described above, the image coding apparatus 100 according to Embodiment 2 of the present invention can stop error propagation due to data loss by restricting the reference field for a field to the immediately-preceding first field as in the case of Embodiment 1.

Further, in coding processing performed by the image coding apparatus 100 according to Embodiment 2 of the present invention, the second P-slice 204 included in each first field refers to the two consecutive fields preceding the current field by one and two fields. In general, the greater the number of reference images (reference fields), the higher the compression rate in coding. Therefore, the image coding apparatus 100 according to Embodiment 2 of the present invention can achieve a compression rate higher than the compression rate achievable by the image coding apparatus 100 in Embodiment 1. The judgment result is No in the case of an I-slice 201 because it is not a first P-slice. Since an I-slice is coded without reference to pixels in another picture, any reference image can be selected based on the judgment result in S111 without affecting actual coding result.

Embodiment 3

Embodiment 3 describes a control method in which skip pictures are used and which is for use with the image coding apparatus 100 according to Embodiment 1.

First, skip pictures are described.

In general, coding distortion occurs when coding data of an image signal at a constant bit rate, and the degree of coding distortion varies depending on the contents of a video to be coded. When coding distortion is likely to be great, many bit counts are assigned to a current picture to be coded in order to reduce the degree of coding distortion, and the following pictures are determined to be skip pictures which are not coded in order to maintain a constant bit rate. If skip pictures are not used in coding, all pictures are inevitably coded using a small bit count, which increases the degree of coding distortion that deteriorates the resulting image quality to an unallowable degree. It is known that the use of skip pictures reduce the degree of deterioration in visual image quality. As described above, even in the case of an image signal which is difficult to be compressed, the use of skip pictures makes it possible to code the video without significantly deteriorating the image quality while maintaining a constant bit rate.

Figure 11:
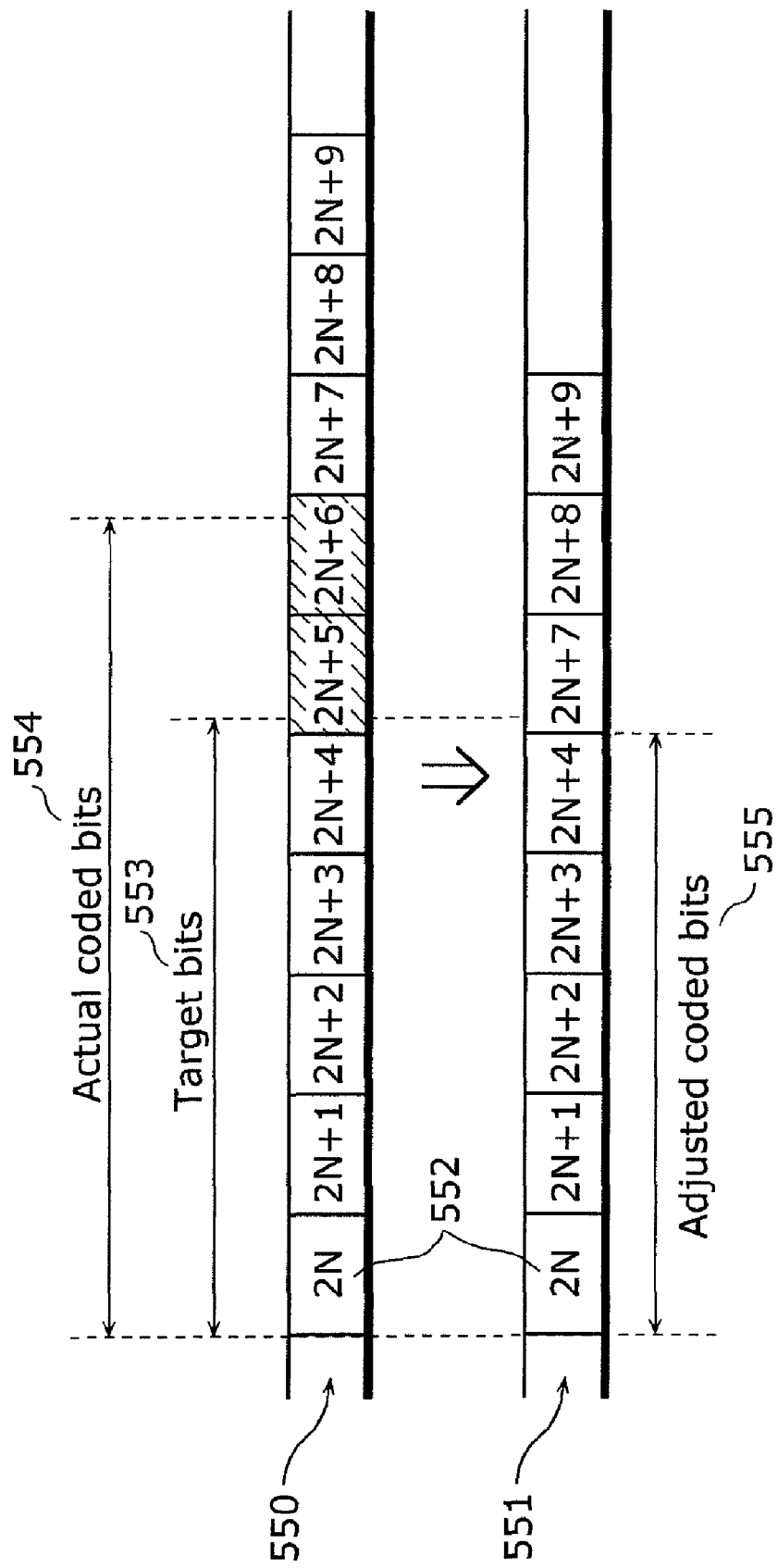
FIG. 11 is a diagram showing coding bits in the case of using skip pictures according to Embodiment 3 of the present invention.

FIG. 11 is a diagram showing coding bits in the case where skip pictures are used. In FIG. 11, coding data 550 shows coding bits of data coded without using any skip pictures, and coding data 551 shows coding bits of data coded using skip pictures. In addition, each of the coded data 550 and 551 includes field coded data 552 which is coded data corresponding to a field. In FIG. 11, "2N" or the like shows a field number (2N) of a field corresponding to the field coded data 552. As in the case of coded data 551, when actual coded bits 554 of the fields from the field 2N to the field 2N+6 exceed target bits 553 by predetermined bits, some of the pictures are skipped. In the exemplary case shown in FIG. 11, the coding bits of the coded data 551 (which are adjusted to coded bits 555) of the fields from the field 2N to the field 2N+6 is reduced below the target bits 553 by skipping the fields denoted as 2N+5 and 2N+6. Subsequently, the field 2N+8 and the following fields are coded next. As the target bit counts, the numbers of bits corresponding to predetermined numbers of fields at arbitrary time points are used in many cases.

A description is given of an exemplary case where skip pictures are simply applied to coding processing performed by the image coding apparatus 100 according to Embodiment 1.

Figure 12:
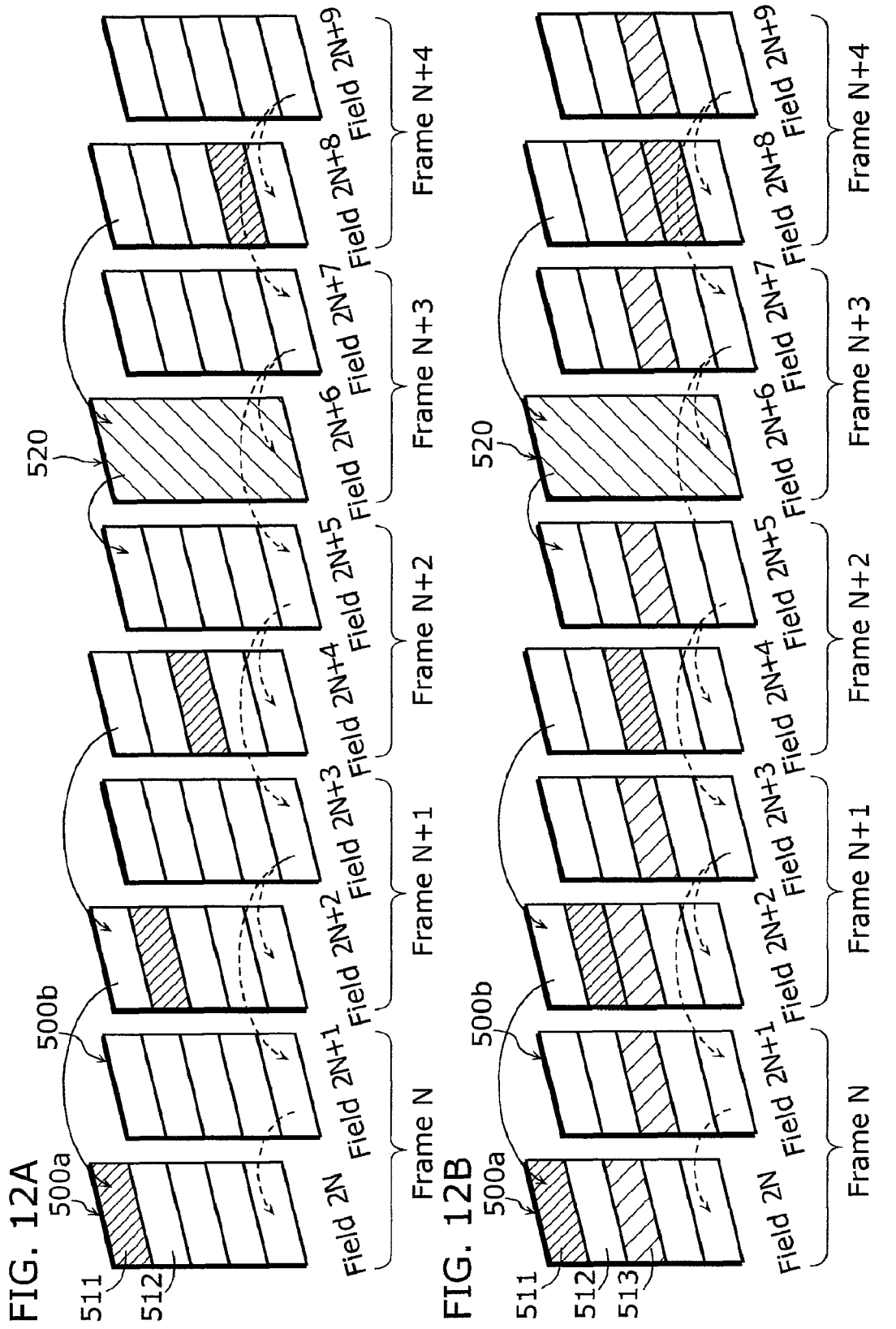
FIG. 12A is a diagram showing an exemplary arrangement of skip pictures in a comparison example of Embodiment 3 of the present invention.
FIG. 12B is a diagram for illustrating error propagation in a comparison example of Embodiment 3 of the present invention.

FIG. 12A is a diagram showing an example of inserting skip pictures in a comparison example of Embodiment 3 according to the present invention. Here, it is assumed that a skip picture 520 is the same as the picture (field) coded immediately before the skip picture 520, and thus has the same pixel values as those of the immediately-preceding picture (field). Accordingly, when a decoding apparatus detects a skip picture in decoding, it repeatedly outputs the picture (field) decoded immediately before the skip picture to a display device or the like.

In addition, as in Embodiment 1, a frame is made up of top fields 500*a* and bottom fields 500*b*.

Each of the top fields 500*a* (the fields denoted as 2N, 2N+2, 2N+4, 2N+6, 2N+8, 2N+10, 2N+12, and 2N+14) includes an I-slice 511 and a P-slice 512.

Each of the bottom fields 500*b* (the fields denoted as 2N+1, 2N+3, 2N+5, 2N+7, 2N+9, 2N+11, 2N+13, and 2N+15) includes a P-slice 511 but does not include any I-slice 511.

The position of a current I-slice 511 included in a current top field 500*a* is sequentially shifted from the top of a frame N to the bottom of a frame N+7. All the positions for I-slices 511 in the respective frames N to N+7 are used in a cycle. In this way, error propagation can be prevented even when data cannot be partly received due to transmission error that is described later.

A current top field 500*a* refers to only the top field 500*a* coded immediately before the current top field 500*a* among the top fields 500*a* coded before the current top field 500*a*.

A current bottom field 500*b* refers to either the top field 500*a* coded immediately before the current bottom field 500*b* or the bottom field 500*b* coded immediately before the current bottom field 500*b* among the bottom fields 500*b* coded before the current bottom field 500*b*. More specifically, the field having the higher correlation with the block (or slice or picture) including the pixel to be coded is adaptively selected. This makes it possible to achieve a high compression rate in coding. In most cases, when great motion is estimated for a current bottom field 500*b* to be coded, the field referred to is the top field 500*a* coded immediately before the current bottom field 500*b* and temporally close to the current bottom field 500*b*, and when small motion is estimated for a current bottom field 500*b* to be coded, the field referred to is the bottom field 500*b* coded immediately before the current bottom field 500*b* among the bottom fields 500*b* coded before the current bottom field 500*b* and has pixels co-located with the pixels of the current bottom field 500*b*. It is to be noted that, the firstly-appearing bottom field 500*b* refers to only the first top field 500*a* in the coding because there is no coded bottom field 500*b*.

FIG. 12B is a diagram showing error propagation in the case where a transmission error occurs in a slice 513 included in a field 2N and the slice 513 cannot be received when a coded stream is decoded as in FIG. 12A.

As shown in FIG. 12B, in the case of cording using correlation between pictures, the slice 513 whose image cannot be correctly reconstructed in the decoding is referred to. Thus, when a following picture directly refers to the slice 513 and when a picture decoded with reference to the slice 513 is referred to, the following pictures cannot be correctly decoded. As a result, each of the fields from the field 2N to the field 2N+9 other than the field 2N+4 include an image that cannot be correctly decoded. In other words, error propagation cannot be prevented.

In contrast, a picture reference structure controlled as indicated below enables prevention of error propagation.

Figure 13:
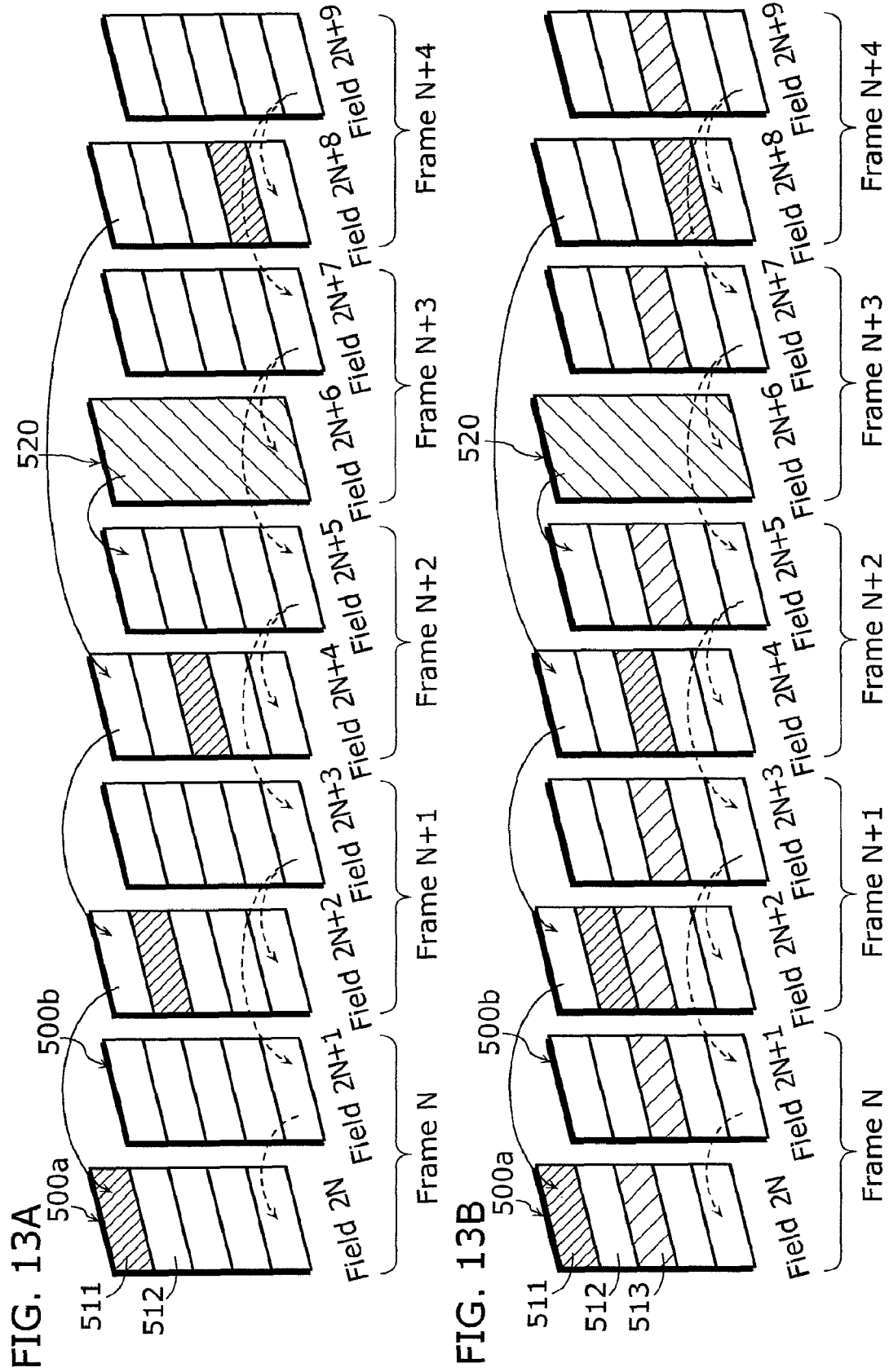
FIG. 13A is a diagram showing an exemplary arrangement of skip pictures in a comparison example of Embodiment 3 of the present invention.
FIG. 13B is a diagram for illustrating error propagation in a comparison example of Embodiment 3 of the present invention.

FIG. 13A is a diagram showing the picture reference structure that enables prevention of error propagation in the image coding method according to the comparison example of Embodiment 3 in the present invention.

As shown in FIG. 13A, the current top field 500*a* that is coded next to a skip picture 520 refers to the top field 500*a* (field 2N+4) that immediately precedes the current top field 500*a* among the top fields 500*a* that precede the current top field 500*a* when the skip picture 520 is excluded.

FIG. 13B is a diagram showing error propagation in the case where the coded stream shown in FIG. 13A is decoded. Even when the slice 513 of the field 2N cannot be correctly received in the decoding as shown in FIG. 13B, the field 2N+8 can be correctly decoded because it refers to the field 2N+4 that can be correctly decoded. This stops the error propagation.

In order to achieve the reference structure shown in FIGS. 13A and 13B, a field 2N+8 needs to refer to the field 2N+4 that precedes the field 2N+8 by four fields. On the other hand, each of the other top fields 500*a* refers to the picture preceding the current field by two fields in the coding. In order to achieve the reference structure shown by FIGS. 13A and 13B, reference pictures for top fields 500*a* need to be adaptively switched under control in this way. This need causes the following problems.

First, switching of reference pictures requires that reference picture information is coded on a picture basis not on a stream basis and then is outputted. This causes a problem that an increased number of bit counts is necessary to generate coded data.

Further, switching of reference pictures on a picture basis is irregular switching of reference pictures in picture coding, which requires more complex implementations of a coding apparatus and a decoding apparatus. In other words, the problem is that the picture reference structure becomes more complex.

To solve this problem, the image coding method performed by the image coding apparatus according to Embodiment 3 of the present invention, a skip picture is started from a field having a parity that allows slices other than I-slices. With this, the image coding apparatus and the image coding method according to Embodiment 3 of the present invention can prevent error propagation and reduce the complexity in picture reference structure.

Figure 14:
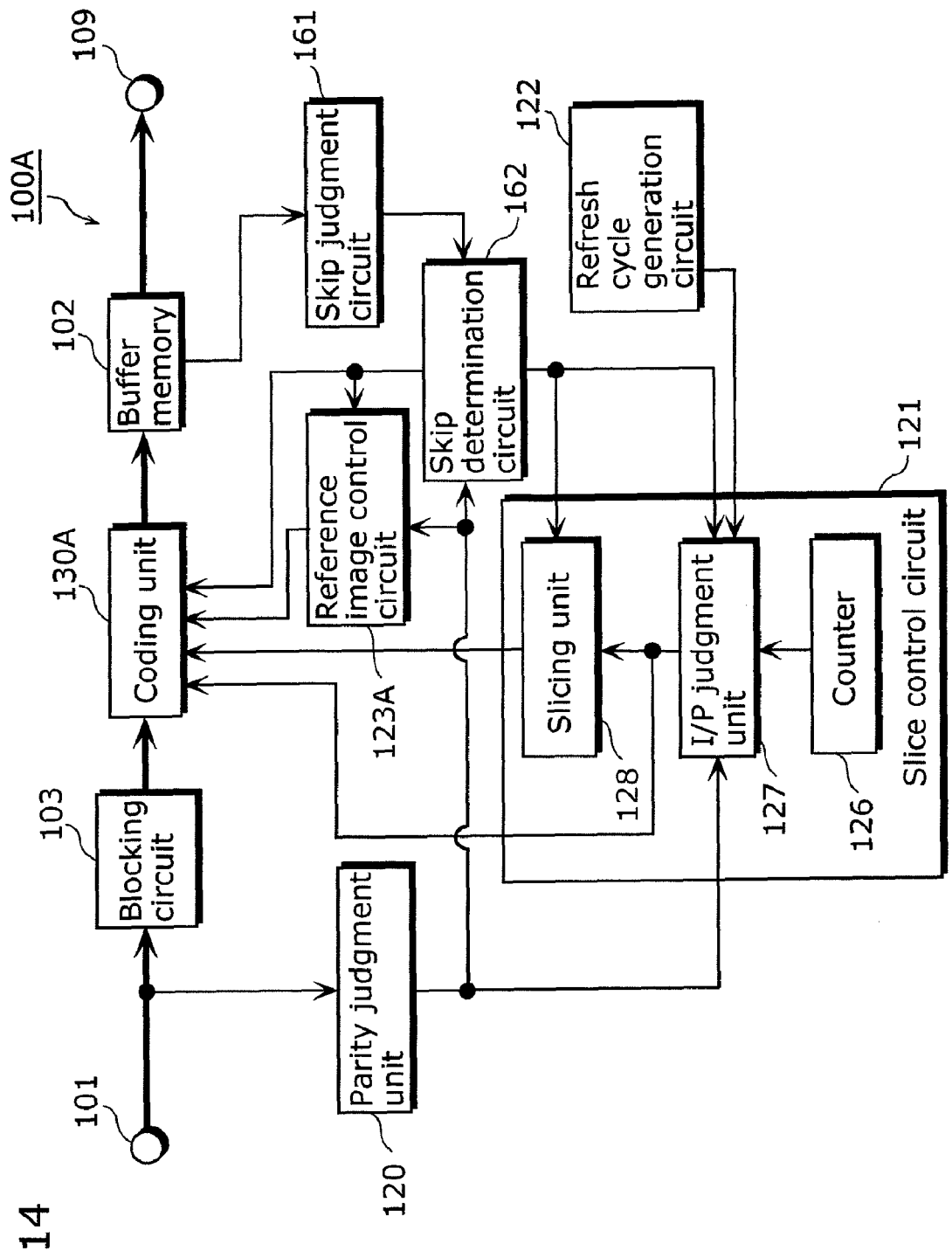
FIG. 14 is a block diagram of the image coding apparatus according to Embodiment 3 of the present invention.

First, a description is given of the structure of an image coding apparatus according to Embodiment 3 of the present invention. FIG. 14 is a block diagram showing the structure of the image coding apparatus according to Embodiment 3 of the present invention. The same elements as in FIG. 1 are assigned with the same numerical references, and the same descriptions are not repeated here.

The image coding apparatus 100A shown in FIG. 14 is a video coding apparatus in conformity with H. 264 (by ITU)/MPEG-4 AVC. The image coding apparatus 100A codes an interlace video signal inputted into a video input terminal 101 in units of a slice to generate a coded stream. The image coding apparatus 100A further includes a skip judgment unit 161 and a skip determination unit 162, in addition to the elements included in the image coding apparatus 100 shown in FIG. 1. The reference image control circuit 123A and the coding unit 130A have different functions from those of the reference image control circuit 123 and the coding unit 130 shown in FIG. 1.

The skip judgment unit 161 judges whether or not a current field to be coded should be a skip picture. This is described in more detail. In the case where the accumulated coded bits of already coded fields during a predetermined period exceed predetermined coding bits, the skip judgment unit 161 judges that the current field should be a skip picture. In the opposite case where the accumulated coded bits of already coded fields during a predetermined period do not reach predetermined coding bits, the skip judgment unit 161 judges that the current field should not be a skip picture. The skip judgment unit 161 notifies the skip determination unit 162 of the judgment result.

The skip determination unit 162 judges whether or not the current field to be coded should be a skip picture, based on (i) the field parities (of the odd fields and even fields to be coded) judged by the parity judgment circuit 120, (ii) the judgment result made by the skip judgment unit 161, and (iii) whether or not the immediately-preceding field is a skip picture.

This is described in more detail. The skip determination unit 162 judges that the current field to be coded should be a skip picture when (i) the skip judgment unit 161 has judged that the current field should be a skip picture, (ii) the parity judgment circuit 120 has judged that the current field is an odd field, and (iii) the immediately-preceding field is a skip picture. In addition, the skip determination unit 162 determines that the current field to be coded is a skip picture when (i) the skip judgment unit 161 has judged that the current field should be a skip picture, and (ii) the parity judgment circuit 120 has judged that the current field is an even field.

Here, a skip picture is a picture regarded as the same as the immediately-preceding field in display order by the decoding apparatus. The immediately-preceding field is the field preceding the current field by a field in display order in the decoding performed by the decoding apparatus. In other words, the immediately-preceding field is the field coded last (immediately before the current field) by the image coding apparatus 100A. In other words, when odd fields are skip pictures, the odd fields are regarded as the same as the immediately-preceding even fields. Likewise, when even fields are skip pictures, the even fields are regarded as the same as the immediately-preceding odd fields. In other words, the decoding apparatus outputs, to a display device such as a TV, the images of the immediately-preceding fields regarded as the same as the skip pictures.

The skip determination unit 162 judges that fields to be coded should not be skip pictures in the other cases. This is described in more detail. The skip determination unit 162 determines that the fields to be coded should not be skip pictures when (I) the skip judgment unit 161 judges that the current picture should not be a skip picture, and (II-i) the skip judgment unit 161 judges that the current picture should be a skip picture, (II-ii) the parity judgment circuit 120 judges that the current field is an odd field, and (II-iii) the immediately-preceding field is not a skip picture.

The skip determination unit 162 notifies the reference image control circuit 123A and the coding unit 130A of the judgment results.

When the current field is determined to be a skip picture by the skip determination unit 162, the reference image control circuit 123A selects the immediately-preceding field as a reference picture. When the current field is determined to be not a skip picture by the skip determination unit 162, and is determined to be an odd field by the parity judgment circuit 120, the reference image control circuit 123A selects, as a reference picture, the field coded immediately before the current field among the fields having the same parity as that of the current field (the immediately-preceding odd field). When the current field is determined to be not a skip picture by the skip determination unit 162, and is determined to be an even field by the parity judgment circuit 120, the reference image control circuit 123A selects only the immediately-preceding field (the odd field coded immediately before the current field) as the reference picture for the current field as a selection made once in a predetermined cycle, and as for the other selections made in the predetermined cycle, selects two consecutive fields (the odd field and the even field preceding the current field by one and two fields).

The coding unit 130A codes, so as to generate a coded stream, the video signal inputted to the video input terminal 101, based on (i) the classification of a slice (an I-slice or a P-slice) judged by the I/P judgment unit 127, (ii) the size of the slice determined by the slicing unit 128, (iii) the presence or absence of a skip picture determined by the skip determination unit 162, and (iv) the reference picture selected by the reference image control circuit 123A, and outputs the coded stream to the coded data output terminal 109.

More specifically, the coding unit 130A codes the pictures other than the skip pictures in units of a slice. Further, the coding unit 130A codes I-slices using intra slice coding, and codes P-slices using inter slice coding or intra slice coding. The coding unit 130A codes the P-slices using inter picture coding with reference to a reference picture selected by the reference image control circuit 123A. Pictures other than the skip pictures are coded in the same manner as described in detail in Embodiment 1.

The coding unit 130A does not code the fields determined to be skip pictures by the skip determination unit 162, and codes only skip information indicating that the fields are skip pictures. More specifically, the skip information indicates that all the blocks included in the fields are skipped or that the blocks included in all the slices of the fields are skipped. In other words, the skip information indicates that the pixel values of the fields are regarded as the same as those in the corresponding blocks included in the immediately-preceding fields.

It is to be noted that the coding unit 130A does not necessarily need to code such skip information, and may generate a coded stream that does not include any data related to the fields as skip pictures (examples of the data include the data corresponds to coded field data and information indicating that the fields are skip pictures). In general, in the case where no data corresponding to current fields exist, a decoding apparatus which decodes such coded stream outputs the images of the immediately-preceding fields as substitutes for the images of the current fields to a display device or the like. In other words, the decoding apparatus outputs, to the display device, video similar to video obtainable in the case where a coded stream containing skip information is generated.

The problem in the case where no skip information is transmitted is that, the decoding apparatus cannot judge whether (i) the field data is lost due to transmission error etc. or (ii) the field data is not included in the stream because the field is a skip picture. In other words, it is advantageous to transmit skip information in terms of helping the decoding apparatus in the error detection. In contrast, it is advantageous not to transmit skip information in terms of reduction in coding bits.

Next, a description is given of operations performed by the image coding apparatus 100A according to Embodiment 3 of the present invention.

Figure 15:
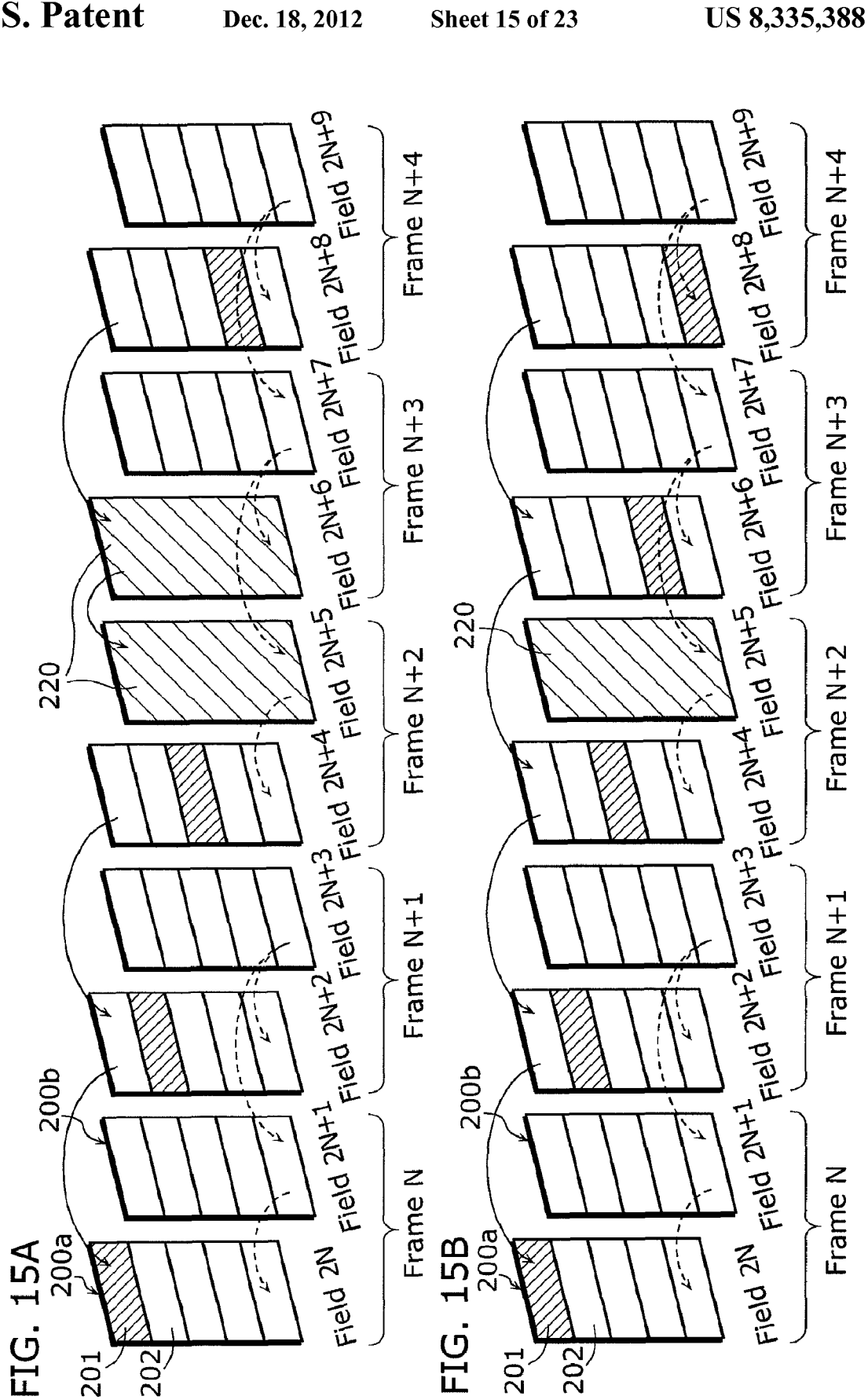
FIG. 15A is a diagram showing an exemplary arrangement of skip pictures and a reference structure used in the image coding apparatus according to Embodiment 3 of the present invention.
FIG. 15B is a diagram showing an exemplary arrangement of skip pictures and a reference structure used in the image coding apparatus according to Embodiment 3 of the present invention.

Each of FIGS. 15A and 15B is a diagram showing a skip and reference structure used by the image coding apparatus 100A according to Embodiment 3 of the present invention.

As shown in FIGS. 15A and 15B, top fields 200a corresponding to odd fields and bottom fields 200b corresponding to even fields are alternately arranged. Each top field 200a includes an I-slice 201 and P-slices 202, and each bottom field 200b includes only P-slices 202.

The position of a current I-slice 201 in a current top field 200a is sequentially shifted from the upper end of the starting top field 200a to the lower end of the ending top field 200a during the period from a frame N to a frame N+4.

As shown in FIGS. 15A and 15B, in coding processing performed by the image coding apparatus 100A, a skip picture 220 is started from a bottom field 200b not having any I-slice 201. In FIG. 15A, the two fields 2N+5 and 2N+6 are skip pictures 220. In FIG. 15B, the I-field of the field 2N+5 is a skip picture 220.

In this case, reference pictures for the fields other than the field 2N that is the firstly-appearing picture can be determined according to the following simple rule.

(1) Instead of a skip picture 220, the field coded immediately before the skip picture 220 is referred to.

(2) A current top field 200a that is not a skip picture 220 refers to the top field 200a coded immediately before the current top field 200a.

(3) A current bottom field 200b that is not a skip picture 220 refers to the top field 200a coded immediately before the current bottom field 200*b* and the bottom field 200*b* coded immediately before the current bottom field 200*b* among the bottom fields 200*b* coded before the current bottom field 200*b*.

The firstly-appearing bottom field 200*b* (the field 2N+1) among the bottom fields 200*b* which are not skip pictures 220 refers to only the top field 200*a* (the field 2N) because there is no bottom field 200*b* before the firstly-appearing bottom field 200*b*.

Here, a description is given of prevention of error propagation in the case where no skip pictures 220 is used in the image coding method according to Embodiment 3 of the present invention.

When no skip pictures 220 are included, each of the top fields 200*a* includes an I-slice 201, and the positions of current I-slices 201 are sequentially shifted to all the field positions in the predetermined cycle (from frame N to N+4) as in Embodiment 1. Each top field 200*a* refers to only the immediately-preceding top field 200*a*. For this reason, error propagation is stopped at least in the predetermined cycle irrespective of the position of the slice that cannot be correctly decoded.

In contrast, error propagation cannot be stopped at bottom fields 200*b* because each bottom field 200*b* refers to the two consecutive fields immediately preceding the current bottom field 200*b*. For this reason, a special bottom field 200*b* (field 2N+1) that refers to only the immediately-preceding top field 200*a* is included in the predetermined period. Since each top field 200*a* can prevent error propagation as described above, the special bottom field 200*b* (field 2N+1) that refers to only the immediately-preceding top field 200*a* can stop the error propagation.

In this way, the image coding method according to Embodiment 3 of the present invention enables prevention of error propagation.

It is assured that a following P-slice 202 can be decoded correctly when the reference range (in which correlation between pixels is used) for the P-slice 202 is restricted to the slice located above an I-slice 201 (at the top in the picture) or the I-slice 201. However, even without such restriction, it is possible to reduce the possibility that an error occurred in a pixel is propagated to the current picture that includes the I-slice including the pixel co-located with the erroneous pixel and the pictures following the current picture. This is because, in general, the slice referred to is the co-located slice in a spatially close picture (such as the immediately-preceding picture).

Next, a description is given of prevention of error propagation in the case where skip pictures 220 are used.

Each of FIGS. 16A and 16B is a diagram showing error propagation in the case of decoding a coded stream shown in FIGS. 15A and 15B.

It is assumed here that a slice 213 of the field 2N shown in FIGS. 16A and 16B cannot be correctly decoded by the decoding apparatus due to the influence of transmission error. In this case, the picture which refers to the slice 213 of the field 2N cannot be correctly decoded, and thus the error in the slice 213 that cannot be correctly decoded propagates to the following picture.

In contrast to this, since the I-slice 201 is located at the slice 213 in the field 2N+4 in the top field 200*a*, the field 2N+4 can be correctly decoded. In the bottom field 200*b*, the field 2N+5 refers to only the correctly decoded field 2N+4, and therefore can be decoded correctly.

As shown in FIG. 16A, even when skip pictures 220 are arranged in sequence, the second skip picture 220 (field 2N+6) in the sequence refers to only the correctly decoded field 2N+5, and therefore can be decoded correctly. Starting a skip picture 220 from a bottom field 200*b* makes it possible to prevent an erroneous picture that cannot be decoded correctly from influencing the following pictures without the necessity of using a complex picture reference structure as shown in FIGS. 13A and 13B.

Even when three or more skip pictures 220 are arranged in sequence, starting a skip picture 220 from a bottom field 200*b* makes it possible to prevent error propagation using the above-described simple picture reference structure as in the case where a single or two consecutive skip pictures are used.

Figure 17:
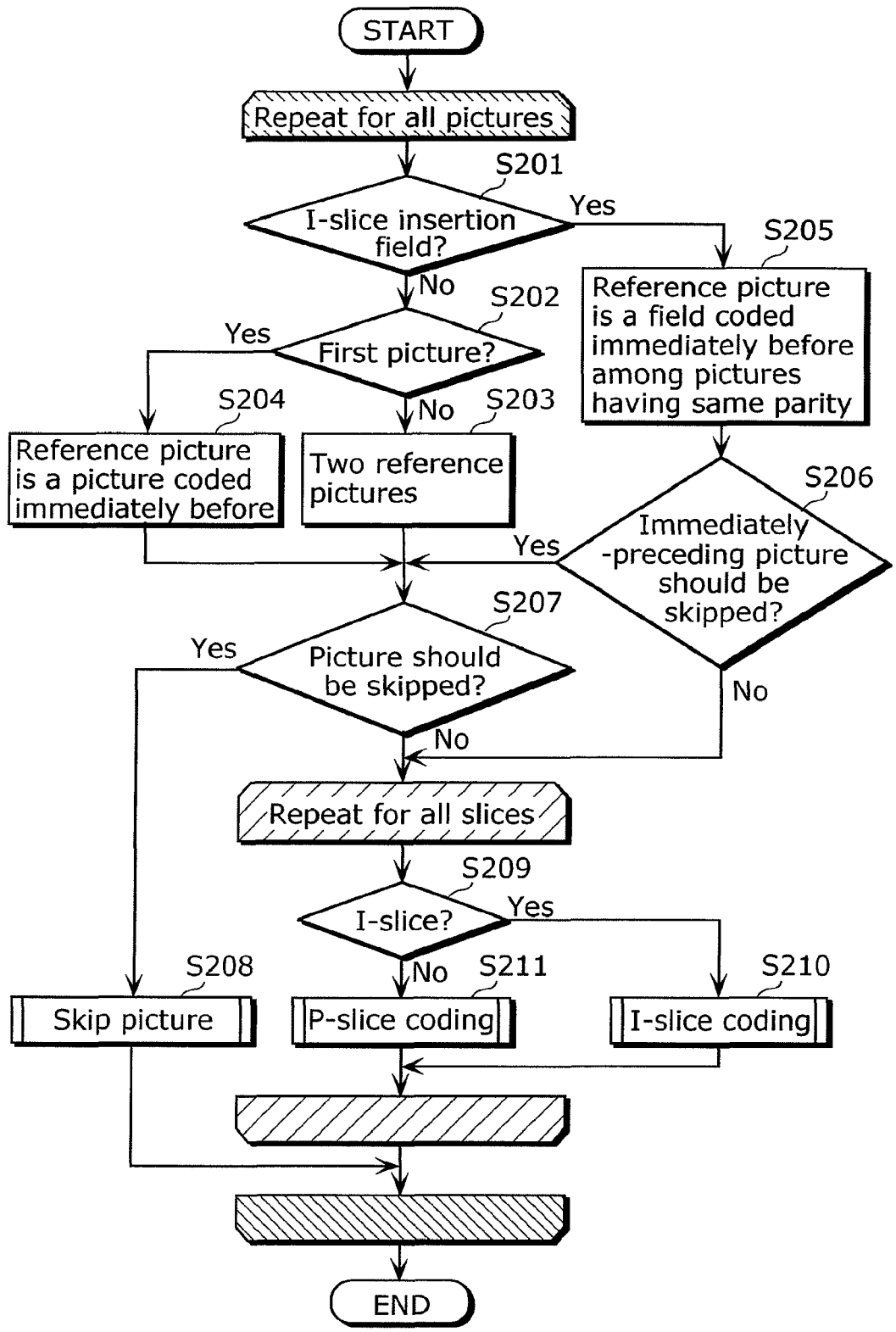
FIG. 17 is a flowchart of an image coding method according to Embodiment 3 of the present invention.

FIG. 17 is a flowchart indicating coding processing performed by the image coding apparatus according to Embodiment 3 of the present invention.

As shown in FIG. 17, the parity judgment circuit 120 judges whether or not a current field to be coded is a field having the parity that allows insertion of an I-slice 201, that is, judges whether or not the current field is a top field 200*a* (S201).

When the current field is a top field 200*a* (Yes in S201), the reference image control circuit 123A determines that the current field can refer to the picture coded immediately before the current field among the pictures having the same parity as that of the current field (S205).

In contrast, when the current field is a bottom field 200*b* that is a field that does not allow insertion of any I-slices (No in S201), the reference image control circuit 123A judges whether or not the current field is the field to be coded first among the fields having the same parity, that is, whether or not the current field is the firstly-appearing bottom field 200*b* (S202).

When the current field is the firstly-appearing bottom field 200*b* (Yes in S202), the reference image control circuit 123A determines that the current field can refer to the field coded immediately before the firstly-appearing bottom field 200*b* and having a different parity (S204). In contrast, when the current field is not the firstly-appearing bottom field 200*b* (No in S202), the reference image control circuit 123A determines that the current field can refer to the two consecutive fields coded immediately before the current field among the fields having the respective parities (S203).

When the current field is a top field 200*a*, the skip determination unit 162 judges whether or not the immediately-preceding field is a skip picture 220 (S206) after the Step S205.

When the immediately-preceding field is not a skip picture 220 (No in S206), the skip determination unit 162 judges that the current field should not be a skip picture 220. In contrast, the immediately-preceding field is a skip picture 220 (Yes in S206), the skip judgment unit 161 judges whether or not the current field should be a skip picture 220 (S207). This is described in more detail. When the coded bits of the already coded fields are equal to or greater than predicted coding bits by predetermined bits, the skip judgment unit 161 judges that the current field should be a skip picture. When the coded bits of the already coded fields are smaller than the predicted coding bits by the predetermined bits, the skip judgment unit 161 judges that the current field should not be a skip picture.

When it is judged that the current field should be a skip picture 220 (Yes in S207), the coding unit 130A processes the current field as the skip picture (S208).

When the current field is a bottom field 200*b*, the skip judgment unit 161 judges whether or not the current field should be a skip picture 220 (S207) after Step S203 or Step S204.

In contrast, when it is judged that the current field should not be a skip picture (No in S207) and that, in Step S206, the immediately-preceding field is not a skip picture 220 (No in Step S206), the coding unit 130A codes the current field in a general manner (S208 to S211).

This is described in more detail. The L/P judgment unit 127 judges whether the current slice included in the current field is an I-slice 201 or a P-slice 202 (S209). When the current slice is an I-slice 201 (Yes in S209), the coding unit 130A performs intra slice coding on the I-slice 201 (S210). In contrast, when the current slice is a P-slice 202 (No in S209), the coding unit 130A performs either intra picture coding on the P-slice 202 or inter picture coding on the P-slice 202 with reference to a reference picture selected by the reference image control circuit 123A.

The image coding apparatus 100A performs the processing steps S208 to S211 on all the slices included in the current field.

The image coding apparatus 100A repeats the processing steps S201 to S211 on all the fields included in the video signal inputted to the video input terminal 101.

In FIG. 17, when a current field to be coded is a top field 200a (Yes in S201), a judgment is made as to whether or not the immediately-preceding field is a skip picture (S206), and then a judgment is made as to whether or not the current field should be a skip picture 220 depending on whether or not the coded bits already exceed the predicted bits (S207). However, it is also good to judge whether or not the current field should be a skip picture 220 (S207), and then to judge whether the immediately-preceding field is a skip picture (S206) with an aim to prevent the top field 200a from being selected as the starting skip picture 220.

The judgments (S206 and S207) regarding skip pictures 220 are made after the selections of reference pictures (S201 to S205) in the above descriptions. However, it is also good to select reference pictures (S201 to S205) after making judgments regarding skip pictures 220 (S206 and S207), or to modify the processing order, or to perform some processes in parallel.

In this way, the image coding apparatus 100A according to Embodiment 3 of the present invention prevents the top field 200a including an I-slice 201 from being selected as the starting skip picture 220. In this way, the first skip picture 220 (a bottom field 200b) refers to only the top field 200a coded immediately before the firstly-appearing skip picture 220. In other words, no error is propagated to the firstly-appearing skip picture 220.

In addition, even when the top field 200a is a skip picture 220, the skip picture 220 (the top field 200a) does not include any propagated error because the skip picture 220 refers to the error-free immediately-preceding skip picture 220.

In this way, the image coding apparatus 100A according to Embodiment 3 of the present invention can prevent error propagation in each top field 200a by preventing each top field 200a from being selected as the starting skip picture 220.

Further, the image coding apparatus 100A can directly use the reference structure shown in FIG. 4 for the fields other than the skip pictures 220. In other words, the image coding apparatus 100A and image coding method according to Embodiment 3 of the present invention can prevent error propagation and reduce the complexity in picture reference structure.

It is to be noted that the same method may be applied to the image coding apparatus 100 according to Embodiment 2.

Embodiment 4

Embodiment 4 of the present invention describes a variation of Embodiment 3.

Each of FIGS. 18A and 18B is a diagram showing a skip and reference structure used by the image coding apparatus 100A according to Embodiment 4 of the present invention.

In Embodiment 3, it is assumed that each of the top fields 200a that constitute a frame includes an I-slice 201 as shown in FIGS. 15A and 15B. In Embodiment 4, each of the bottom fields 200b that constitute a frame includes an I-slice 201.

In this case, the same advantageous effect as in Embodiment 3 can be obtained.

Each of FIGS. 19A and 19B is a diagram showing error propagation in the case of decoding a coded stream shown in FIGS. 18A and 18B. As shown in FIGS. 19A and 19B, a picture 2N+5 in the top field 200a can be correctly decoded because the picture 2N+5 refers to only the correctly decoded picture 2N+4 as in FIGS. 16A and 16B. As shown in FIG. 19A, even when skip pictures 220 are arranged in sequence, the second skip picture 220 (field 2N+6) in the sequence refers to only the correctly decoded field 2N+5, and therefore can be decoded correctly.

Starting a skip picture 220 from the top field 200a not including any I-slice 201 makes it possible to prevent an erroneous picture that cannot be decoded correctly from influencing the following pictures without the necessity of implementing a complex picture reference structure.

In Embodiment 4, it is assumed that each field including an I-slice 201 corresponds to a secondly-appearing field among the two types of fields that constitute a frame, whereas it is assumed in Embodiments 3 that each field including an I-slice 201 corresponds to a firstly-appearing field among the two types of fields that constitute a frame. The use of the firstly-appearing fields each including an I-slice 201 makes it possible to reduce image quality deterioration due to transmission error in various applications such as random reproduction and fast reproduction in which (i) images are extracted in units of a frame and (ii) the firstly-appearing fields each including an I-slice 201 are used as the starting points for display.

A coded stream includes information indicating whether the firstly-appearing field among the two types of fields that constitute a frame is a top field 200a or a bottom field 200b. Thus, the decoding apparatus judges whether the current field to be decoded firstly is a top field 200a or a bottom field 200b with reference to the information indicating a field type.

The second field among the two types of fields that constitute a frame may include an I-slice 201.

In Embodiments 1 to 4, it is assumed that the top fields each including an I-slice 201 and the bottom fields not including any I-slice 201 are alternately arranged. However, one of plural top fields may include an I-slice 201. For example, a field per four fields may include an I-slice 201.

In Embodiments 1 to 4, a field having a parity that allows inclusion of an I-slice 201 refers to the immediately-preceding field among the fields having the same parity. However, without such limitation, a field having a parity that allows inclusion of an I-slice 201 may refer to any one of the preceding fields having the same parity.

In Embodiments 1 to 4, it is assumed that a field not having any I-slice 201 refers to two fields. However, a field not having any I-slice 201 may refer to three or more fields. Otherwise, a field having a parity that does not allow inclusion of an I-slice 201 may refer to only a single field other than the immediately-preceding field. For example, it is also good to adaptively select, as a reference field, either the immediately-preceding field or the field preceding the current fields by two fields (the immediately-preceding field from among the fields having the same parity).

In Embodiments 1 to 4, it is assumed that only the firstly-appearing field among the fields not including an I-slice 201 refers to the immediately-preceding field, but any other fields not including an I-slice 201 may refer to only the immediately-preceding field.

In Embodiments 1 to 4, it is assumed that the field that refers to only the immediately-preceding field among the fields not including an I-slice 201 is the firstly-appearing field (field 2N+1). However, the field that refers to only the immediately-preceding field may be any other fields not including an I-slice 201.

In Embodiments 1 to 4, the position of a current I-slice 201 is sequentially shifted to each of the fields allowed to include an I-slice 201 in the current cycle, more specifically, the position of the current I-slice is shifted from the top of the starting field to the bottom of the ending field in the current cycle. However, the position of a current I-slice 201 may be sequentially shifted to each of the fields that allows inclusion of an I-slice 201 in the current cycle, more specifically, the position of the current I-slice is shifted from the bottom of a starting field to the top of an ending field. In other words, it is only necessary that the position of a current I-slice included in a current odd field in a current refresh cycle is shifted from a first end of the starting odd field to a second end of the ending odd field.

Each of Embodiments 1 to 4 provides an example of dividing each field into slices such that each slice is divided on a line basis, but each field may be divided into slices such that at least one slice is divided in the middle of a line. I-slices 201 and P-slices 202 may vary in size (the number of blocks). Further, the unit of dividing a picture into slices may vary for each picture. It is to be noted that variance in the sizes of I-slices 201 included in the respective pictures results in a change in coding rate.

Each of Embodiments 1 to 4 provides an example where a field having a parity that allows inclusion of an I-slice 201 includes only a single I-slice 201. However, two or more I-slices may be included.

Embodiment 5

Embodiment 5 of the present invention describes an example where the processing shown in Embodiment 1 is performed in an independent computer system using a recording medium such as a flexible disc storing a program for implementing the image coding apparatus 100 shown in Embodiment 1.

Figure 20A:
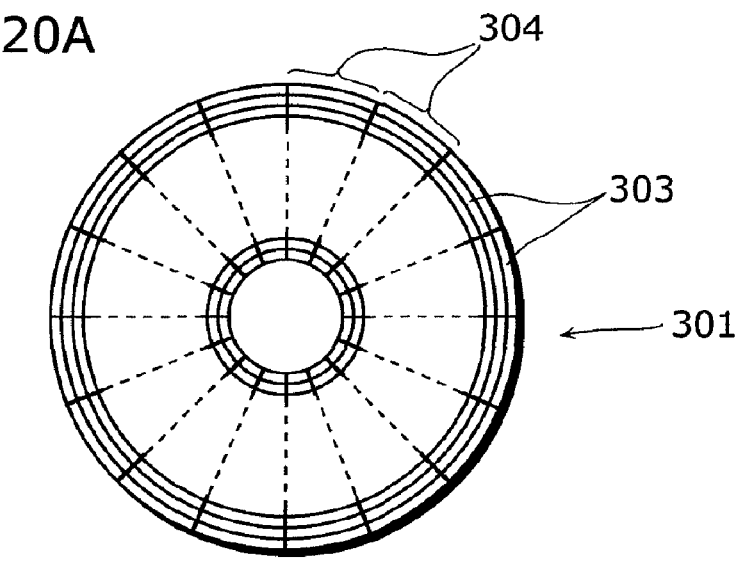
FIG. 20A is a diagram showing the structure of a recording medium according to Embodiment 5 of the present invention.
Figure 20B:
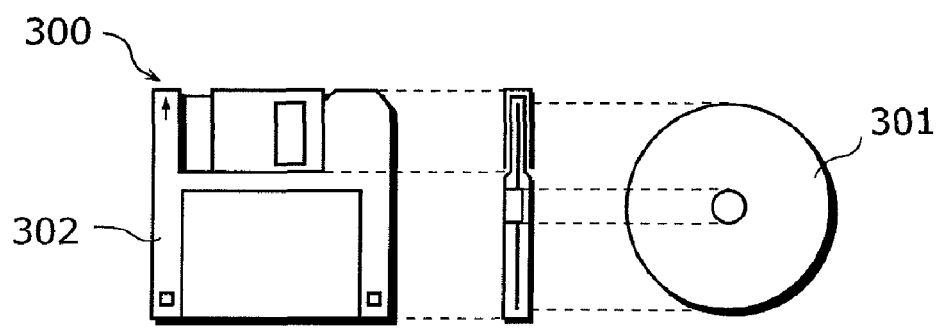
FIG. 20B is a diagram showing the structure of the recording medium according to Embodiment 5 of the present invention.
Figure 20C:
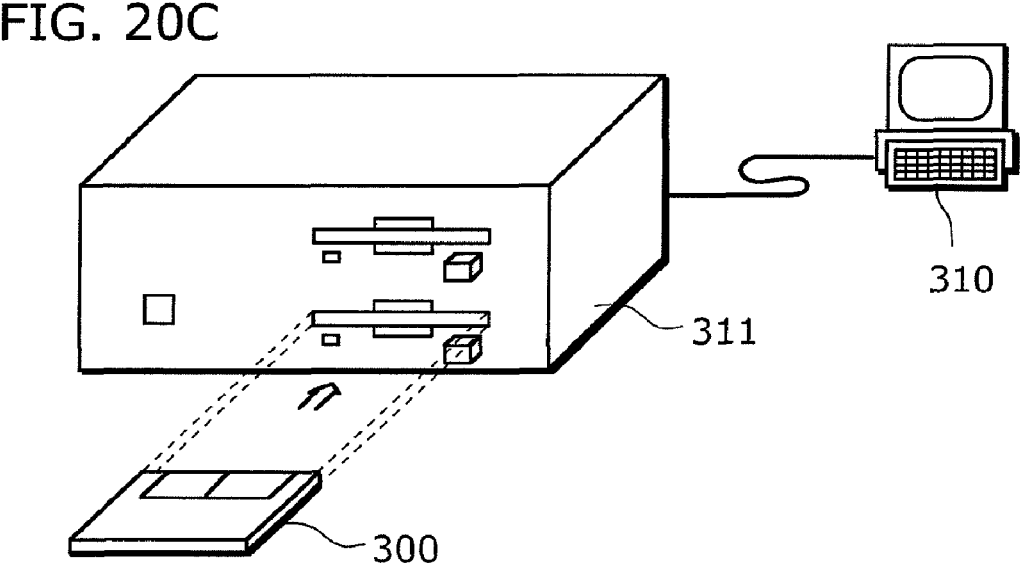
FIG. 20C is a diagram showing the structure of a computer system according to Embodiment 5 of the present invention.
Figure 21:
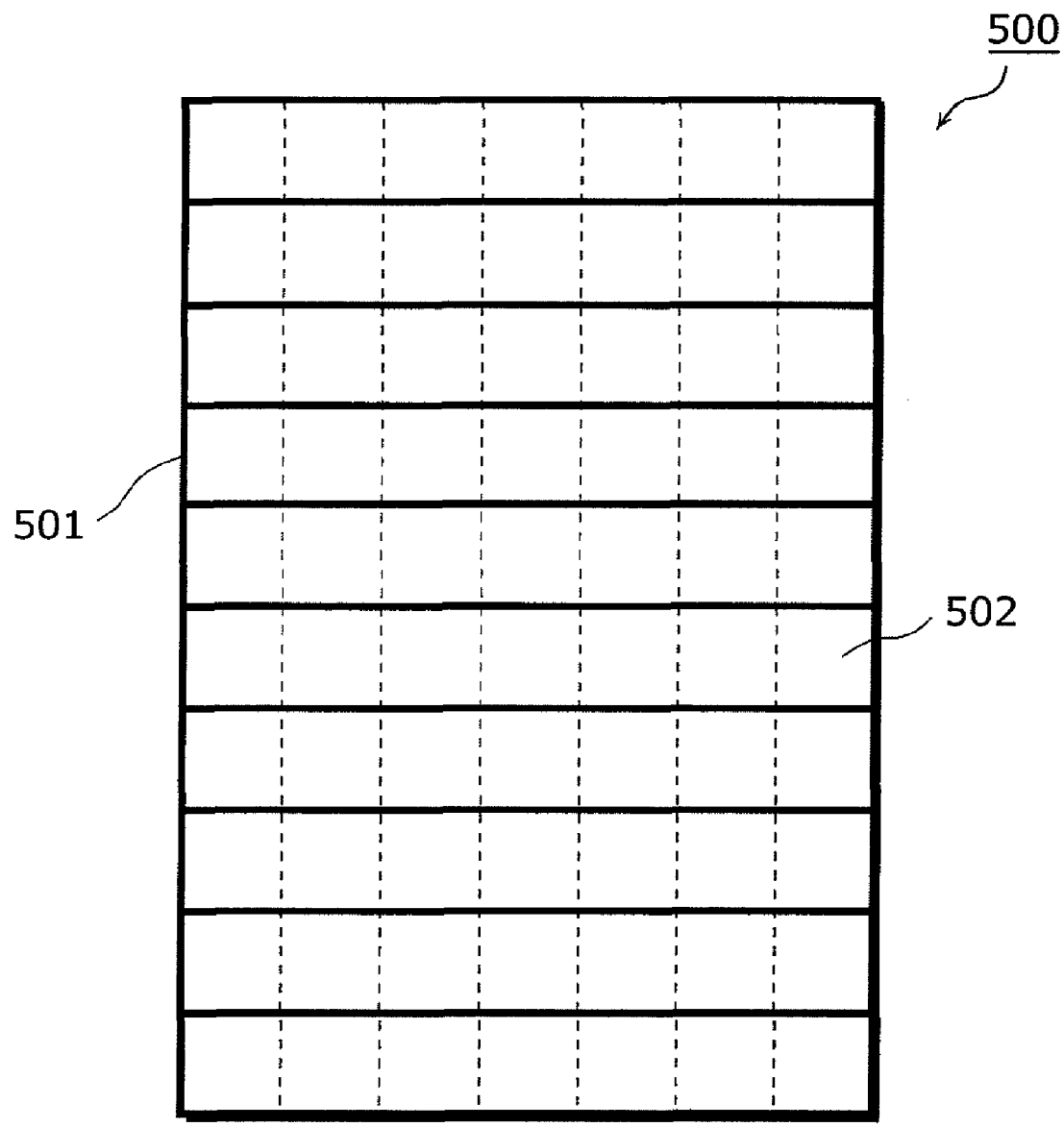
FIG. 21 is a diagram showing the relationship between slices and blocks in MPEG-2.
Figure 22:
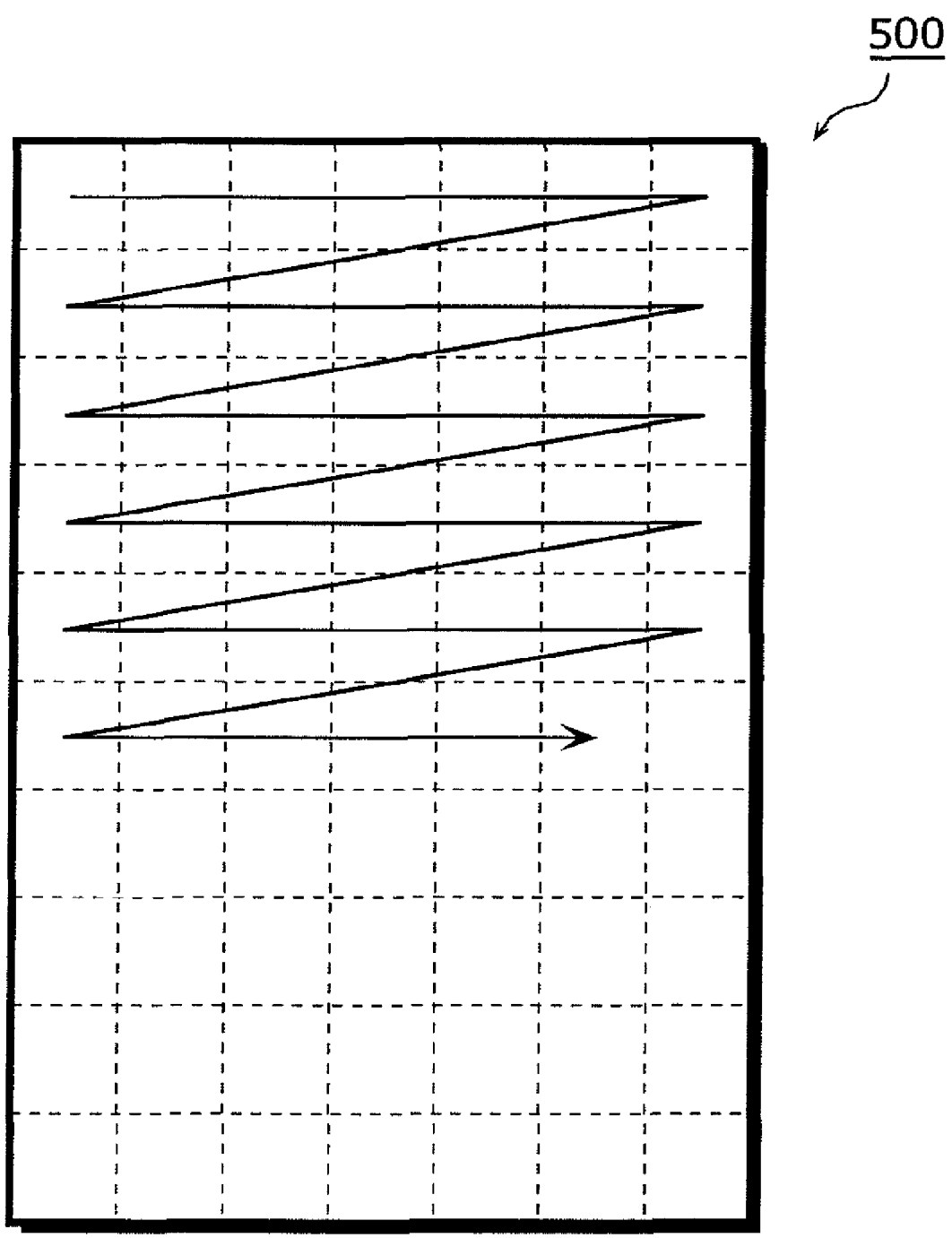
FIG. 22 is a diagram showing the coding order of the blocks in a picture.
Figure 23:
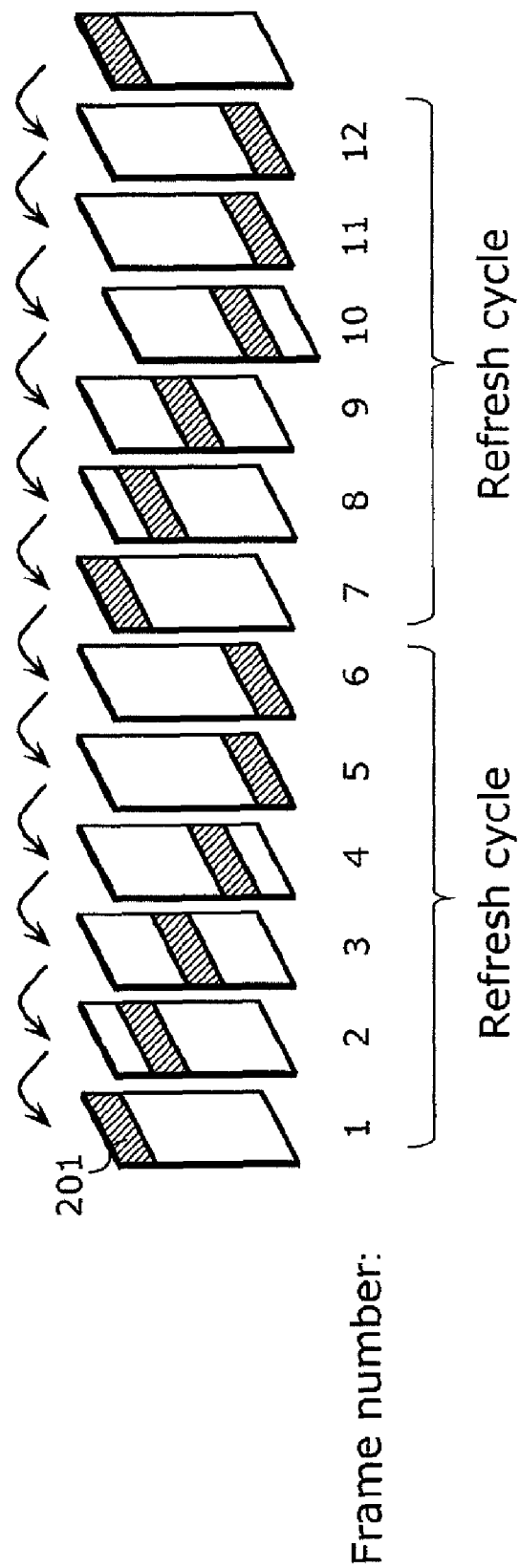
FIG. 23 is a block showing the structures of slices and reference images in a conventional coding apparatus.

Each of FIG. 20A to 20C is an illustration of a recording medium such as a flexible disc storing a program for implementing, in a computer system, the image coding apparatus 100 according to Embodiment 1.

FIG. 20A is a diagram showing an example of a physical format of a flexible disc which is a recording medium body. FIG. 20B shows the front view of the appearance of the flexible disc 300, the cross-sectional structure of the flexible disc 300, and a disc 301.

The flexible disc 300 includes a case 302 and a disc 301 contained in the case 302. On the surface of the disc 301, a plurality of tracks 303 are formed concentrically on the surface of the disc from the periphery into the inner radius of the disc, and each track 303 is divided into sixteen sectors 304 in the angular direction. The aforementioned program is recorded in an area allocated for it on the flexible disc 301.

FIG. 20C shows the configuration of a computer system 310 which records the program onto the flexible disc 300, reads the program from the flexible disc 300, and reproduces the program. When the program for implementing an image coding apparatus 100 is recorded on the flexible disc 300, the computer system 310 writes the program via a flexible disc drive 311.

In addition, when the functions of the image coding apparatus 100 are implemented in the computer system 310 by executing the program recorded on the flexible disc 300, the program is read from the flexible disc 300 through the flexible disc drive 311 and is transferred to the computer system 310. The computer system 310 implements the functions of the image coding apparatus 100 by executing the transferred program.

It is to be noted that the above description is given assuming that the recording medium is a flexible disc 300, but an optical disc can be used instead. In addition, the recording medium is not limited to flexible discs, and other recording media such as IC cards and ROM cassettes and the like can also be used for the implementation. The computer system 310 may execute the program recorded on not only a recording medium attachable/detachable to/from the computer system 310, but also the program recorded on either an HDD (hard disc drive) included in the computer system 310, a non-volatile memory, a RAM, or a ROM. Further, the computer system 310 may execute the program obtained through a wired or wireless communication network.

In addition, the image coding apparatuses 100 and 100A can be implemented in the computer system 310 according to Embodiments 2 to 4 in the same manner.

It is to be noted that each of the functional blocks included in the image coding apparatuses 100 and 100A shown in FIG. 1 and FIG. 14 may be implemented in form of an LSI which is an integrated circuit. Each of the LSIs may be implemented as a single chip. Alternately, all or some of the LSIs maybe integrated into a single chip. For example, the functional blocks other than the memory may be integrated into a single chip. Here, each of the integrated circuits used here is called LSI, but it may also be called IC, system LSI, super LSI, or ultra LSI depending on the degree of integration.

Moreover, ways to achieve integration are not limited to the LSIs, and special circuits or general purpose processors can also achieve the integration. A field programmable gate array (FPGA) that can be programmed after manufacturing an LSI or a reconfigurable processor that allows re-configuration of the connection or settings of the circuit cells inside the LSI can be used for the same purpose.

Furthermore, if advanced semiconductor technology and technology derived therefrom are applied to a technique of manufacturing integrated circuits which replace LSIs in the future, the functional blocks may be integrated using the technique as a matter of course. Application of biotechnology is one such possibility.

In addition, it is also good to separately configure only the storage unit for storing data to be coded among the functional blocks without integrating into a single chip.

The image coding methods and image coding apparatuses according to the present invention have been described based on the above-described Embodiments, but the present invention is not limited to these Embodiments. Although only some exemplary embodiments of this invention have been described in detail above, those skilled in the art will readily appreciate that many modifications and variations are possible in the exemplary embodiments and any combinations of the structural elements in Embodiments 1 to 5 are possible without materially departing from the novel teachings and advantages of this invention. Accordingly, all such modifications, variations, and combinations are intended to be included within the scope of this invention.

INDUSTRIAL APPLICABILITY

The present invention is applicable to image coding apparatuses, and in particular to image coding apparatuses which code interlace video signals and for use with digital televisions, digital video cameras, digital video recorders, personal computers, PDAs (Personal Digital Assistants), mobile telephones, and the like. The present invention is applicable to communication apparatuses and set apparatuses which are intended for video coding, and included in various systems using networks. Such systems include interactive video communication systems, video distribution systems, and surveillance camera systems.

What is claimed is:

1. An image coding apparatus which divides each of image data which is included in a corresponding one of fields into blocks each having a predetermined size, and performs predictive coding on each of the divided blocks, said image coding apparatus comprising:
    a parity judgment unit configured to judge whether a current field to be coded among the fields is a first field or a second field;
    a slice control unit configured to (i) divide the current field into an I-slice including intra coding blocks among the blocks and P-slices each including inter coding blocks among the blocks, and (ii) determine a position of a current I-slice in a current first field included in a predetermined number of first fields such that the current I-slice is sequentially shifted, on a per first field basis, from a first end of a starting first field to a second end of an ending first field in the predetermined number of first fields and such that a shift similar to the shift from the starting first field to the ending first field is repeated for each predetermined number of first fields, said slice control unit making the division (i) and the determination (ii) in a case where the current field is the first field;
    a reference image control unit configured to determine, in the case where the current field to be coded is the first field, that each P-slice located between the first end and the current I-slice or located at the first end of the current first field can refer to only a first field coded immediately before the current first field including the P-slice among first fields coded before the current first field, and to determine, in a case where the current field to be coded is the second field, that at least one second field included in a predetermined number of second fields can refer to only a first field coded immediately before at least one second field, the first fields referred to in both the case where the current field is the first field and the case where the current field is the second field being reference fields; and
    a coding unit configured to code all of the intra coding blocks included in each I-slice with reference to pixels within the I-slice, and code all of the inter coding blocks included in each P-slice with reference to either pixels within the field including the P-slice or pixels in a determined reference field of the reference fields.

2. The image coding apparatus according to claim 1, wherein said slice control unit is configured to divide the current field into only P-slices in the case where the current field to be coded is the second field.

3. The image coding apparatus according to claim 2, wherein said reference image control unit is configured to determine, in the case where the current field to be coded is the second field, that at least one second field included in the predetermined number of second fields can refer to only a first field coded immediately before at least one second field, and each of the other second fields in the predetermined number of second fields can refer to a plurality of reference fields determined for the second field.

4. The image coding apparatus according to claim 1, wherein said reference image control unit is configured to determine, in the case where the current field to be coded is the first field, that each P-slice located closer to the second end than a corresponding one of the I-slices among the P-slices included in the current field can refer to a plurality of reference fields.

5. The image coding apparatus according to claim 1, wherein said reference image control unit is configured to determine, in the case where the current field to be coded is the second field and when the I-slice is located at the first end of the first field coded immediately before the current second field, that the current second field can refer to only the first field coded immediately before the current second field.

6. The image coding apparatus according to claim 1, wherein said reference image control unit is configured to determine that at least one second field located backward of the first field including the I-slice at the second end can refer to only the first field coded immediately before at least one second field, the at least one second field being among second fields included in the predetermined number of second fields.

7. The image coding apparatus according to claim 1, further comprising:
    a skip judgment unit configured to judge whether or not the current field to be coded should be a skip picture that is regarded as the same as an immediately-preceding field in a display order; and
    a skip determination unit configured to determine that the current field is the skip picture when (i) the immediately-preceding field is the skip picture and (ii) said skip judgment unit judges that the current field should be the skip picture in the case where the current field is the first field, and determine that the current field is the skip picture when the skip judgment unit judges that the current field is the skip picture in the case where the current field is the second field,
    wherein said coding unit is configured to code the fields other than the fields determined to be the skip pictures by said skip determination unit.

8. The image coding apparatus according to claim 7, wherein, in the case where the current field is the second field and when said skip determination unit determines that the current field is not the skip picture, said coding unit codes the current second field with reference to either the first field coded immediately before the current second field or the second field coded immediately before the current second field among second fields coded before the current second field.

9. The image coding apparatus according to claim 7, wherein said coding unit is configured to code information indicating that the current field is the skip picture when said skip determination unit determines that the current field is the skip picture.

10. The image coding apparatus according to claim 7, wherein said coding unit is configured to generate a stream which does not include data corresponding to the current field to be coded when said skip determination unit determines that the current field is the skip picture.

11. The image coding apparatus according to claim 1,
    wherein the first field is a firstly-appearing field of a frame, and
    the second field is a next field of the frame.

12. An image coding method for dividing each of image data which is included in a corresponding one of fields into blocks each having a predetermined size, and performing predictive coding on each of the divided blocks, said image coding method comprising:

judging whether a current field to be coded among the fields is a first field or a second field;

(i) dividing the current field into an I-slice including intra coding blocks among the blocks and P-slices each including inter coding blocks among the blocks, and (ii) determining a position of a current I-slice in a current first field included in a predetermined number of first fields such that the current I-slice is sequentially shifted, on a per first field basis, from a first end of a starting first field to a second end of an ending first field in the predetermined number of first fields and such that a shift similar to the shift from the starting first field to the ending first field is repeated for each predetermined number of first fields, said dividing (i) and said determining (ii) being performed in a case where the current field is the first field;

determining, in the case where the current field to be coded is the first field, that each P-slice located between the first end and the current I-slice or located at the first end of the current first field can refer to only a first field coded immediately before the current first field including the P-slice among first fields coded before the current first field, and determining, in a case where the current field to be coded is the second field, that at least one second field included in a predetermined number of second fields can refer to only a first field coded immediately before at least one second field, the first fields referred to in both the case where the current field is the first field and the case where the current field is the second field being reference fields; and coding all of the intra coding blocks included in each I-slice with reference to pixels within the I-slice, and coding all of the inter coding blocks included in each P-slice with reference to either pixels within the field including the P-slice or pixels in a determined reference field of the reference fields.

13. A non-transitory computer-readable recording medium having a program recorded thereon, the program being for dividing each of image data which is included in a corresponding one of fields into blocks each having a predetermined size, and performing predictive coding on each of the divided blocks, and the program causing a computer to execute an image coding method comprising:

judging whether a current field to be coded among the fields is a first field or a second field;

(i) dividing the current field into an I-slice including intra coding blocks among the blocks and P-slices each including inter coding blocks among the blocks, and (ii) determining a position of a current I-slice in a current first field included in a predetermined number of first fields such that the current I-slice is sequentially shifted, on a per first field basis, from a first end of a starting first field to a second end of an ending first field in the predetermined number of first fields and such that a shift similar to the shift from the starting first field to the ending first field is repeated for each predetermined number of first fields, said dividing (i) and said determining (ii) being performed in a case where the current field is the first field;

determining, in the case where the current field to be coded is the first field, that each P-slice located between the first end and the current I-slice or located at the first end of the current first field can refer to only a first field coded immediately before the current first field including the P-slice among first fields coded before the current first field, and determining, in a case where the current field to be coded is the second field, that at least one second field included in a predetermined number of second fields can refer to only a first field coded immediately before at least one second field, the first fields referred to in both the case where the current field is the first field and the case where the current field is the second field being reference fields; and coding all of the intra coding blocks included in each I-slice with reference to pixels within the I-slice, and coding all of the inter coding blocks included in each P-slice with reference to either pixels within the field including the P-slice or pixels in a determined reference field of the reference fields.

14. An integrated circuit which divides each of image data which is included in a corresponding one of fields into blocks each having a predetermined size, and performs predictive coding on each of the divided blocks, said integrated circuit comprising:

a parity judgment unit configured to judge whether a current field to be coded among the fields is a first field or a second field;

a slice control unit configured to (i) divide the current field into an I-slice including intra coding blocks among the blocks and P-slices each including inter coding blocks among the blocks, and (ii) determine a position of a current I-slice in a current first field included in a predetermined number of first fields such that the current I-slice is sequentially shifted, on a per first field basis, from a first end of a starting first field to a second end of an ending first field in the predetermined number of first fields and such that a shift similar to the shift from the starting first field to the ending first field is repeated for each predetermined number of first fields, said slice control unit making the division (i) and the determination (ii) in a case where the current field is the first field;

a reference image control unit configured to determine, in the case where the current field to be coded is the first field, that each P-slice located between the first end and the current I-slice or located at the first end of the current first field can refer to only a first field coded immediately before the current first field including the P-slice among first fields coded before the current first field, and to determine, in a case where the current field to be coded is the second field, that at least one second field included in a predetermined number of second fields can refer to only a first field coded immediately before at least one second field, the first fields referred to in both the case where the current field is the first field and the case where the current field is the second field being reference fields; and a coding unit configured to code all of the intra coding blocks included in each I-slice with reference to pixels within the I-slice, and code all of the inter coding blocks included in each P-slice with reference to either pixels within the field including the P-slice or pixels in a determined reference field of the reference fields.

* * * * *